(12) United States Patent
Seshadrinathan et al.

(10) Patent No.: US 9,501,826 B2
(45) Date of Patent: Nov. 22, 2016

(54) RECTIFICATION TECHNIQUES FOR HETEROGENEOUS CAMERA ARRAYS

(71) Applicant: INTEL CORPORATION, Santa Clara, CA (US)

(72) Inventors: Kalpana Seshadrinathan, Santa Clara, CA (US); Oscar Nestares, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 163 days.

(21) Appl. No.: 14/270,687

(22) Filed: May 6, 2014

(65) Prior Publication Data

US 2015/0326801 A1   Nov. 12, 2015

(51) Int. Cl.
| | | |
|---|---|---|
| *G06K 9/36* | (2006.01) | |
| *G06T 7/00* | (2006.01) | |
| *H04N 5/357* | (2011.01) | |
| *H04N 13/02* | (2006.01) | |

(52) U.S. Cl.
CPC .............. *G06T 7/002* (2013.01); *G06T 7/004* (2013.01); *H04N 5/357* (2013.01); *H04N 13/0242* (2013.01); *G06T 2207/30208* (2013.01)

(58) Field of Classification Search
USPC ................ 382/284, 294, 153, 154, 103; 1/1; 345/135, 419; 348/241; 358/450
See application file for complete search history.

(56) References Cited

U.S. PATENT DOCUMENTS

| | | | | |
|---|---|---|---|---|
| 6,259,826 | B1* | 7/2001 | Pollard ................. | H04N 1/047 358/450 |
| 7,103,212 | B2* | 9/2006 | Hager .................. | G06T 7/0077 345/419 |
| 7,397,929 | B2* | 7/2008 | Nichani ................. | G01V 8/10 382/103 |
| 9,241,111 | B1* | 1/2016 | Baldwin ............... | G03B 35/08 |
| 2003/0156751 | A1 | 8/2003 | Lee et al. | |
| 2008/0002879 | A1 | 1/2008 | Jeon et al. | |
| 2009/0153669 | A1 | 6/2009 | Kim et al. | |
| 2010/0329543 | A1 | 12/2010 | Li et al. | |
| 2013/0271578 | A1 | 10/2013 | Richards | |

OTHER PUBLICATIONS

Fusiello et al., "A compact algorithm for rectification of stereo pairs", Machine Vision and Applications, 12: 16-22, 2000, 7 pages.
Kang et al., "An efficient rectification algorithm for multi-view images in parallel camera array", 3DTV-CON'08, May 28-30, 2008.
An et al., "An efficient rectification method for Trinocular Stereovision," Proceedings of the 17th International Conference on Pattern Recognition, Aug. 2004, 4 pages.
Okutomi et al., "A Multiple-Baseline Stereo", IEEE Trans. Pattern Analysis and Machine Intelligence. 1993, 11 pages.
International Search Report and Written Opinion received for PCT Patent Application No. PCT/US2015/024457, mailed Jul. 1, 2015, 9 pages.

* cited by examiner

*Primary Examiner* — Anh Do

(57) ABSTRACT

Rectification techniques for camera arrays in which the resolutions, fields of view, and/or pixel sizes of various cameras may differ from one another are described. In one embodiment, for example, an apparatus may comprise logic, at least a portion of which is in hardware, the logic to receive a captured image array captured by a heterogeneous camera array, select a rectification process for application to the captured image array, identify a set of rectification maps for the selected rectification process, and apply the identified set of rectification maps to the captured image array to obtain a rectified image array. Other embodiments are described and claimed.

25 Claims, 13 Drawing Sheets

<u>200</u>

<u>202-1</u>   <u>202-2</u>   <u>202-3</u>

<u>250</u>

<u>252-1</u>   <u>252-2</u>   <u>252-3</u>

RECTIFICATION TECHNIQUES FOR HETEROGENEOUS CAMERA ARRAYS

BACKGROUND

In the field of image acquisition and processing, the use of a camera array to capture multiple images of a scene may enable the implementation of techniques for disparity and depth estimation, view interpolation, and three-dimensional reconstruction, for example. Such techniques may require determination of inter-image correspondences between pixel locations in respective images captured by the various cameras in the array. Image rectification may be employed in order to simplify these determinations. However, conventional image rectification techniques do not accommodate heterogeneous camera arrays, in which the resolutions, fields of view, and/or pixel sizes of the various cameras may differ from one another.

DETAILED DESCRIPTION

Various embodiments may be generally directed to rectification techniques for heterogeneous camera arrays. In one embodiment, for example, an apparatus may comprise logic, at least a portion of which is in hardware, the logic to receive a captured image array captured by a heterogeneous camera array, select a rectification process for application to the captured image array, identify a set of rectification maps for the selected rectification process, and apply the identified set of rectification maps to the captured image array to obtain a rectified image array. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
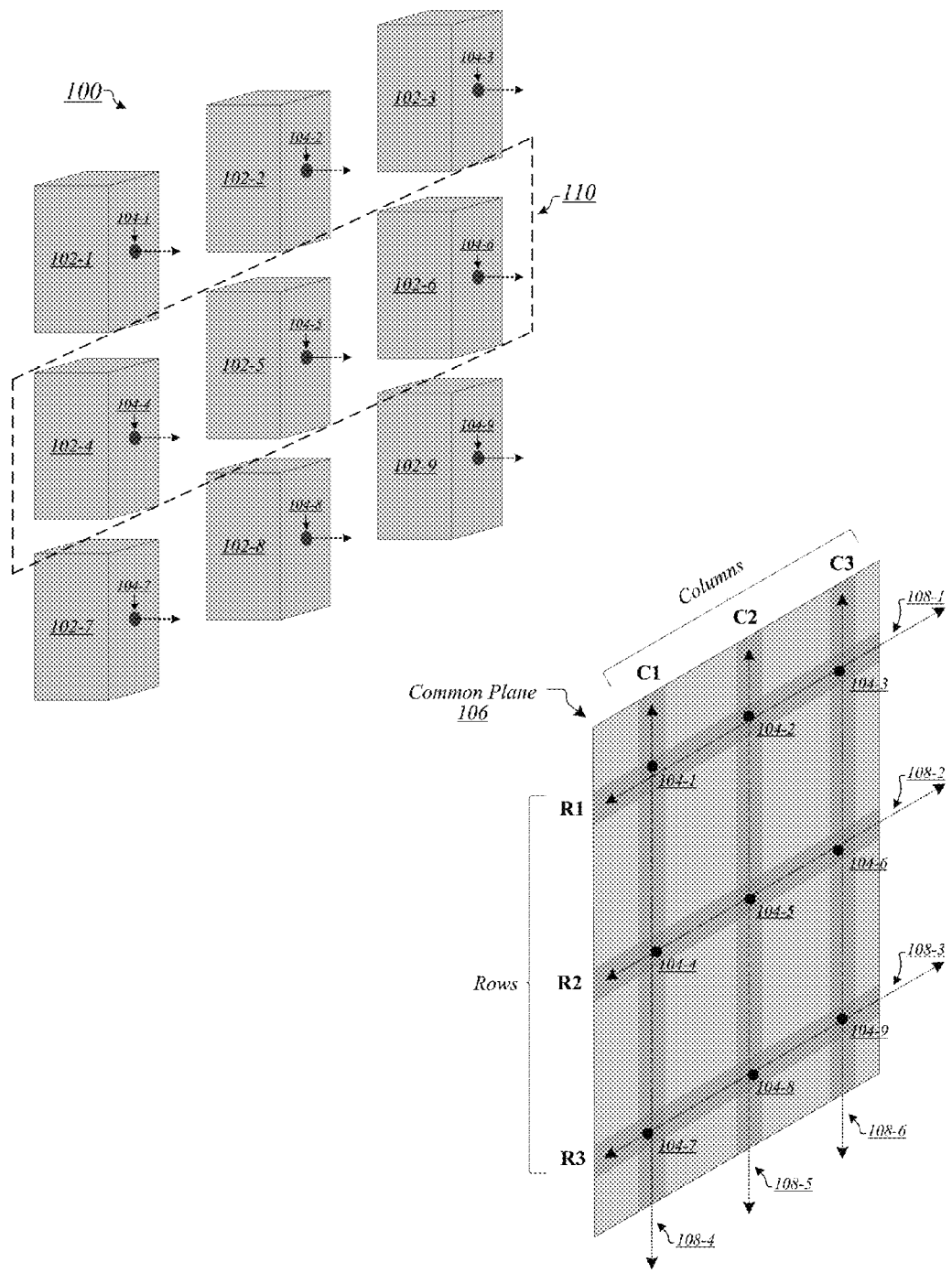
FIG. 1 illustrates an embodiment of a camera array.

Various embodiments may involve the application of rectification techniques to images captured by cameras in planar rectilinear camera arrays. A planar rectilinear camera array generally comprises a camera array in which the respective optical centers of the cameras all lie approximately on a planar, rectilinear grid. FIG. 1 illustrates an example camera array 100 such as may be representative of a planar rectilinear camera array in conjunction with which rectification techniques may be implemented in various embodiments. As shown in FIG. 1, camera array 100 comprises nine cameras, labeled 102-1 to 102-9, oriented as illustrated by the dashed arrows included therein. Each camera 102 comprises a respective optical center 104. For example, camera 102-1 comprises an optical center 104-1. The embodiments are not limited to this example.

As shown in FIG. 1, the optical centers 104 of the various cameras 102 all lie approximately on a common plane 106. Furthermore, the optical centers 104 are arranged such that each approximately resides within one of three rows and one of three columns within common plane 106. For example, the optical centers 104-1, 104-4, and 104-7 all lie approximately on line 108-4 defining column C1, and thus may be said to reside in column C1, and the optical centers 104-7, 104-8, and 104-9 all lie approximately on line 108-3 defining row R3, and thus may be said to reside in row R3. Some planar rectilinear camera arrays, such as example camera array 100, feature multiple rows and columns of cameras. Hereinafter, such planar rectilinear camera arrays shall be referred to as "two-dimensional (2D)" camera arrays. Other planar rectilinear camera arrays may simply comprise a single row or single column of cameras. Hereinafter, such planar rectilinear camera arrays shall be referred to as "linear" camera arrays. For example, in FIG. 1, a linear camera array 110 comprises cameras 102-4, 102-5, and 102-6, each of which resides in row R2 of common plane 106. It is to be appreciated that because the optical centers of the cameras within such arrays may be situated approximately on—but not necessarily precisely on—the planar rectilinear grid, the actual arrangement of optical centers in a particular 2D camera array may actually be three-dimensional, and the actual arrangement of optical centers in a particular linear camera array may actually be two-dimensional or three-dimensional. The embodiments are not limited in this context.

Figure 2A:
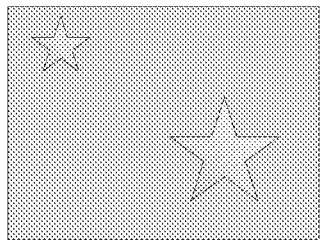
FIG. 2A illustrates an embodiment of a first captured image array.
Figure 2A:
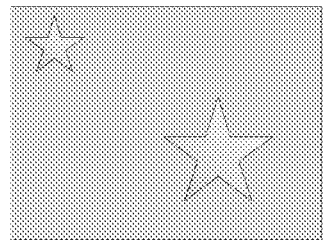
Figure 2A:
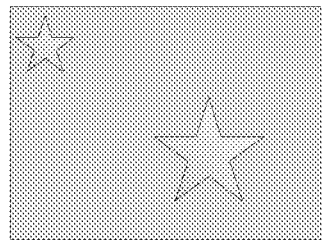

FIG. 2A illustrates a captured image array 200 such as may be representative of a set of images captured by a homogenous camera array. Captured image array 200 comprises images 202-1, 202-2, and 202-3. Each of images 202-1, 202-2, and 202-3 comprises a same resolution, indicating that the cameras capturing those images are of equal resolutions. Each of images 202-1, 202-2, and 202-3 depicts a same field of view (FOV), indicating that the cameras capturing those images feature equal FOVs. The embodiments are not limited in this context.

Figure 2B:
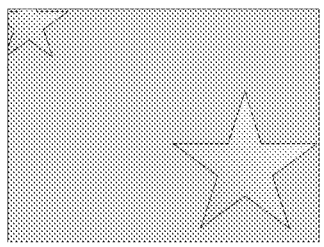
FIG. 2B illustrates an embodiment of a second captured image array.
Figure 2B:
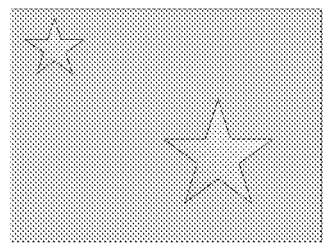
Figure 2B:
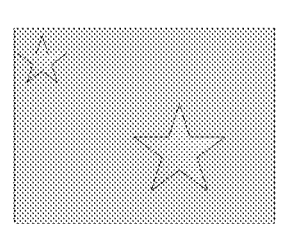

FIG. 2B illustrates a captured image array 250 such as may be representative of a set of images captured by a heterogeneous camera array in some embodiments. Herein, the term "heterogeneous camera array" is defined as a camera array in which the resolution and/or FOV of at least one camera differs from the resolution and/or FOV of at least one other camera. Captured image array 250 comprises images 252-1, 252-2, and 252-3. Images 252-1 and 252-2 comprise a same resolution, but image 252-2 depicts a wider field of view than does image 252-1. This indicates that the camera capturing image 252-2 features a wider field of view than does the camera capturing image 252-1. Images 252-2 and 252-3 comprise a same field of view, but image 252-3 comprises a smaller resolution than does image 252-2. This indicates that the camera capturing image 252-3 is of a smaller resolution than that capturing image 252-2. The embodiments are not limited in this context.

In various embodiments, it may be desirable to determine inter-image correspondences between pixel locations in respective images of a captured image array, such as captured image array 200 of FIG. 2A and/or captured image array 250 of FIG. 2B. For example, in some embodiments, it may be desirable to determine such inter-image correspondences in order to enable the implementation of techniques for disparity and depth estimation, view interpolation, and/or three-dimensional reconstruction. In various embodiments, in order to facilitate and/or simplify these determinations, it may be desirable to rectify the images of the captured image array.

Figure 3:
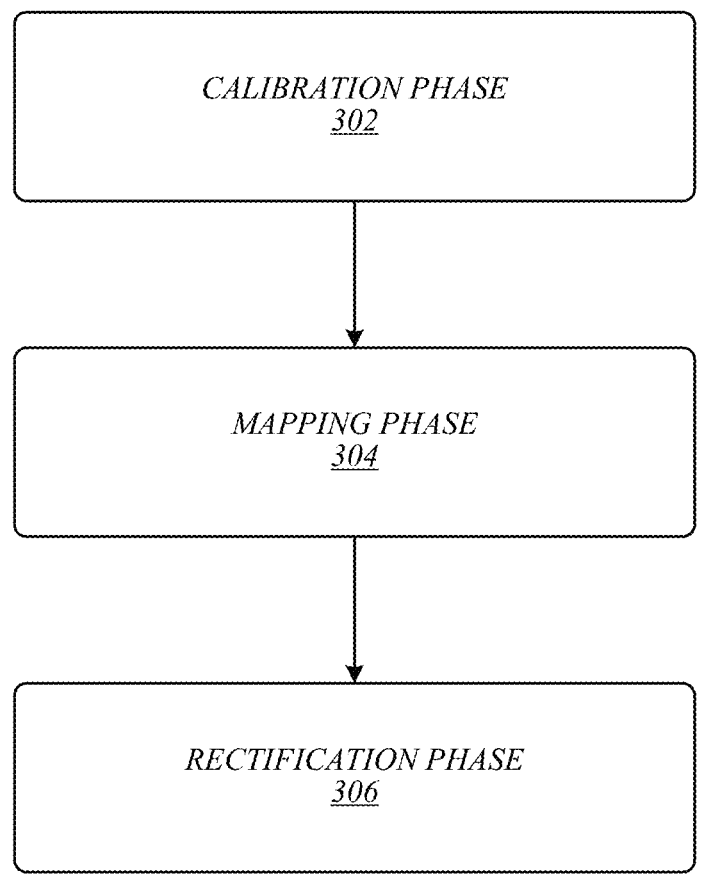
FIG. 3 illustrates an embodiment of an imaging management procedure.

FIG. 3 illustrates an imaging management procedure 300 such as may be representative of a procedure followed in order to enable rectification of images of a captured image array, such as captured image array 200 of FIG. 2A and/or captured image array 250 of FIG. 2B, in some embodiments. More particularly, FIG. 3 illustrates various phases that may be comprised within such an imaging management procedure 300. As shown in FIG. 3, imaging management procedure 300 may comprise a calibration phase 302, a mapping phase 304, and a rectification phase 306. During calibration phase 302, a calibration process may be performed for a camera array, according to which intrinsic and/or extrinsic parameters of the camera array may be determined. Examples of intrinsic parameters may include, without limitation, focal lengths, principal points, and skews of cameras within the camera array. Examples of extrinsic parameters may include, without limitation, rotation matrices, translation vectors, and optical centers of cameras within the camera array. In various embodiments, the calibration process may additionally involve the determination of one or more composite intrinsic and/or extrinsic parameters that characterize the camera array as a whole. During mapping phase 304, mapping information may be generated for use in rectification of images captured by the camera array. In some embodiments, this mapping information may be generated based on intrinsic and/or extrinsic parameters determined during calibration phase 302. During rectification phase 306, rectification may be performed on the images of a captured image array that is captured by the camera array. In various embodiments, this rectification may be performed using mapping information generated during mapping phase 304. The embodiments are not limited in this context.

It is worthy of note that the phases of imaging management procedure 300 may not necessarily occur in uninterrupted sequence. For example, in some embodiments, calibration phase 302 and mapping phase 304 may comprise operations performed during or shortly after manufacture of a camera array, while rectification phase 306 may comprise operations performed at subsequent points in time at which the camera array is used to capture images. Additionally, in various embodiments, one or more of the phases in imaging management procedure 300 may be repeated over time. For example, in some embodiments, calibration phase 302 and/or mapping phase 304 may be periodically repeated in order to account for changes that may occur with respect to intrinsic and/or extrinsic parameters of the camera array. The embodiments are not limited in this context.

Figure 4:
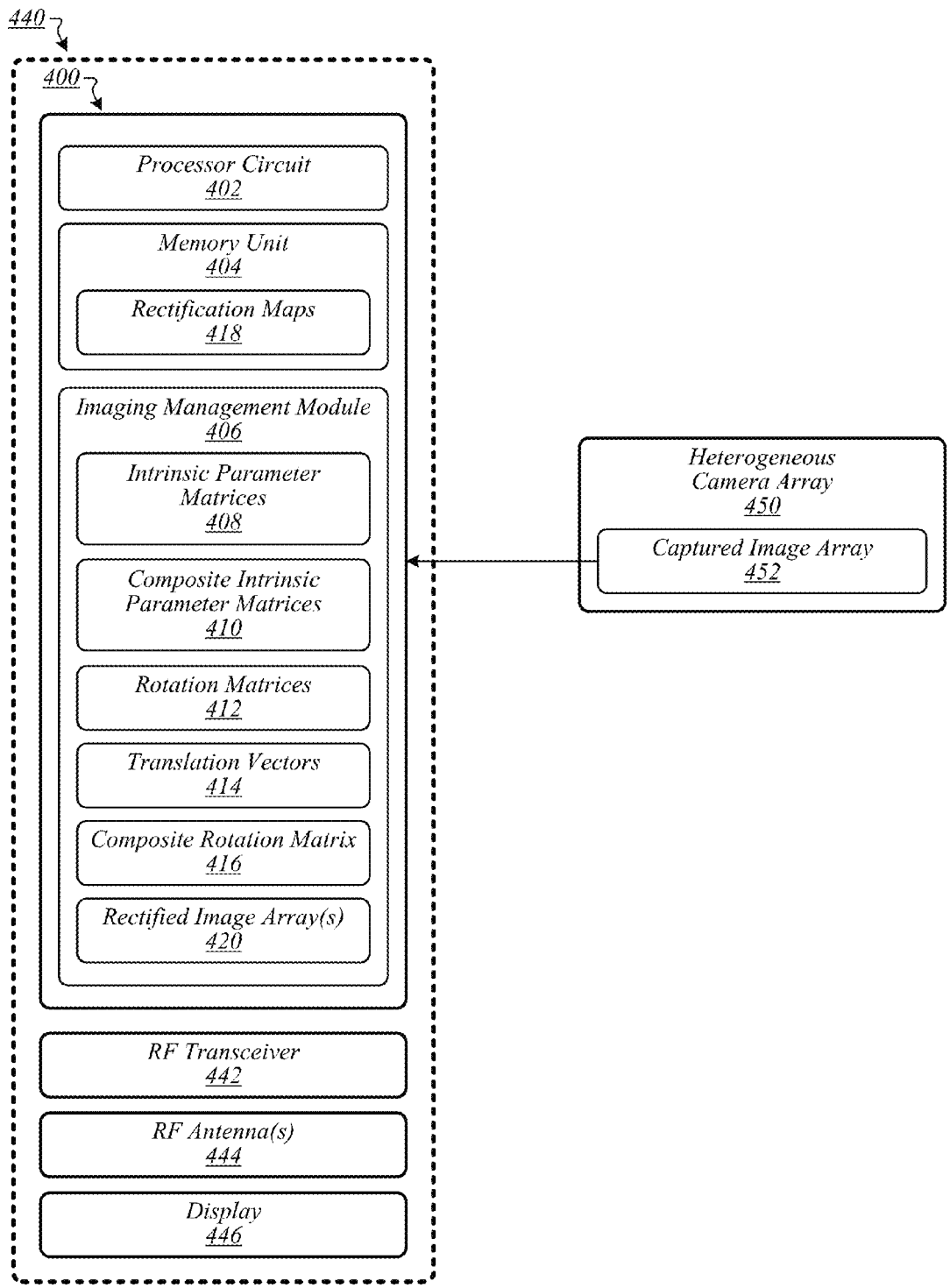
FIG. 4 illustrates an embodiment of an apparatus and an embodiment of a first system.

FIG. 4 illustrates a block diagram of an apparatus 400 such as may be operative in various embodiments to implement rectification techniques for a heterogeneous camera array. As shown in FIG. 4, apparatus 400 comprises multiple elements including a processor circuit 402, a memory unit 404, and an imaging management module 406. The embodiments, however, are not limited to the type, number, or arrangement of elements shown in this figure.

In some embodiments, apparatus 400 may comprise processor circuit 402. Processor circuit 402 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 402 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 402 may be implemented as a general purpose processor, such as a processor made by Intel® Corporation, Santa Clara, Calif. The embodiments are not limited in this context.

In various embodiments, apparatus 400 may comprise or be arranged to communicatively couple with a memory unit 404. Memory unit 404 may be implemented using any machine-readable or computer-readable media capable of storing data, including both volatile and non-volatile memory. For example, memory unit 404 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 404 may be included on the same integrated circuit as processor circuit 402, or alternatively some portion or all of memory unit 404 may be disposed on an integrated circuit or other medium, for example a hard disk drive, that is external to the integrated circuit of processor circuit 402. Although memory unit 404 is comprised within apparatus 400 in FIG. 4, memory unit 404 may be external to apparatus 400 in some embodiments. The embodiments are not limited in this context.

In some embodiments, apparatus 400 may comprise an imaging management module 406. Imaging management module 406 may comprise logic, circuitry, and or instructions to capture, process, edit, compress, store, print, and/or display one or more images. In various embodiments, imaging management module 406 may be operative to manage the capture of images by a camera array and/or may be operative to manage the processing of such captured images.

In some embodiments, imaging management module 406 may be operative to implement an imaging management procedure, such as imaging management procedure 300 of FIG. 3, in conjunction with managing image capture and/or processing for a camera array. The embodiments are not limited in this context.

FIG. 4 also illustrates a block diagram of a system 440. System 440 may comprise any of the aforementioned elements of apparatus 400. System 440 may further comprise a radio frequency (RF) transceiver 442. RF transceiver 442 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver 442 may operate in accordance with one or more applicable standards in any version. The embodiments are not limited in this context.

In various embodiments, system 440 may comprise one or more RF antennas 444. Examples of any particular RF antenna 444 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In some embodiments, RF transceiver 442 may be operative to send and/or receive messages and/or data using one or more RF antennas 444. The embodiments are not limited in this context.

In various embodiments, system 440 may comprise a display 446. Display 446 may comprise any display device capable of displaying information received from processor circuit 402. Examples for display 446 may include a television, a monitor, a projector, and a computer screen. In one embodiment, for example, display 446 may be implemented by a liquid crystal display (LCD), light emitting diode (LED) or other type of suitable visual interface. Display 446 may comprise, for example, a touch-sensitive display screen ("touchscreen"). In some implementations, display 446 may comprise one or more thin-film transistors (TFT) LCD including embedded transistors. The embodiments, however, are not limited to these examples.

In general operation, apparatus 400 and/or system 440 may be operative to implement rectification techniques for a heterogeneous camera array 450. In various embodiments, the heterogeneous camera array 450 may comprise a planar rectilinear camera array, such as a 2D camera array or a linear camera array. In some embodiments, some cameras within heterogeneous camera array 450 may be of different resolutions than other cameras within heterogeneous camera array 450. In various embodiments, some cameras within heterogeneous camera array 450 may feature different fields of view than other cameras within heterogeneous camera array 450. In some embodiments, some cameras within heterogeneous camera array 450 may implement different pixel sizes than other cameras within heterogeneous camera array 450. It is worthy of note that although heterogeneous camera array 450 is depicted in FIG. 4 as being external to apparatus 400 and system 440, heterogeneous camera array 450 may be comprised within apparatus 400 and/or system 440 in various embodiments. The embodiments are not limited in this context.

In some embodiments, imaging management module 406 may be operative to perform a calibration process for heterogeneous camera array 450. In various embodiments, the calibration process may involve determining intrinsic and/or extrinsic parameters for heterogeneous camera array 450. Examples of intrinsic parameters may include, without limitation, focal lengths, principal points, and skews of cameras within heterogeneous camera array 450. Examples of extrinsic parameters may include, without limitation, rotation matrices, translation vectors, and optical centers of cameras within heterogeneous camera array 450. In some embodiments, imaging management module 406 may be operative to determine one or more intrinsic and/or extrinsic parameters that describe heterogeneous camera array 450 as a whole, rather than describing particular cameras within heterogeneous camera array 450. The embodiments are not limited in this context.

In various embodiments, imaging management module 406 may be operative to generate a respective intrinsic parameter matrix 408 for each camera in heterogeneous camera array 450. In some embodiments, each intrinsic parameter matrix 408 may comprise a focal length, principal point, and skew for the camera to which it corresponds. In various embodiments, imaging management module 406 and/or one or more other components may be operative to perform measurements on a given camera in order to determine that cameras focal length, principal point, and skew, and imaging management module 406 may be operative to generate the intrinsic parameter matrix 408 for that camera based on those measurements. In some embodiments, each intrinsic parameter matrix 408 may comprise values expressed in pixel units. In various other embodiments, one or more intrinsic parameter matrices 408 may comprise values expressed in physical units, such as millimeters, for example. In such embodiments, imaging management module 406 may be operative to subsequently convert such values into pixel units in order to establish a uniform basis for comparison and/or manipulation of the intrinsic parameter matrices 408 for the various cameras of heterogeneous camera array 450. The embodiments are not limited in this context.

In some embodiments, imaging management module 406 may be operative to generate one or more composite intrinsic parameter matrices 410. Each composite intrinsic parameter matrix 410 may comprise one or more composite intrinsic parameters that are descriptive of heterogeneous camera array 450 as a whole or of a subset of cameras within heterogeneous camera array 450. In various embodiments, each composite intrinsic parameter matrix 410 may comprise a composite focal length, a composite principal point, and/or a composite skew for heterogeneous camera array 450 or a subset of cameras within heterogeneous camera array 450. In some embodiments, imaging management module 406 may be operative to generate each composite intrinsic parameter matrix 410 based on one or more intrinsic parameter matrices 408. For example, in various embodiments, imaging management module 406 may be operative to generate a given composite intrinsic parameter matrix 410 by averaging a set of intrinsic parameter matrices 408 with respect to one or more intrinsic parameters. In an example embodiment, imaging management module 406 may be operative to compute a composite skew as an average of the respective skews in a set of intrinsic parameter matrices 408, and may be operative to include that composite skew within a composite intrinsic parameter matrix 410.

In some embodiments, imaging management module 406 may be operative to generate a composite intrinsic parameter matrix 410 based on all of the intrinsic parameter matrices 408. In various embodiments, imaging management module 406 may additionally or alternatively be operative to generate one or more composite intrinsic parameter matrices 410 based on subsets of intrinsic parameter matrices 408. In some embodiments, such subsets of intrinsic parameter matrices may correspond to cameras featuring particular resolutions and/or FOVs. For example, in various embodiments, imaging management module 406 may be operative to generate a composite intrinsic parameter matrix 410 by averaging the intrinsic parameter matrices 408 of the lowest-resolution cameras within heterogeneous camera array 450. The embodiments are not limited to this example.

In some embodiments, imaging management module 406 may be operative to define a reference coordinate system and to determine rotation matrices 412 and translation vectors 414 for the cameras in heterogeneous camera array 450 according to that reference coordinate system. In various embodiments, each rotation matrix 412 may describe a difference between the orientation of a particular camera and a reference orientation of the reference coordinate system. In some embodiments, the reference orientation may comprise the $\hat{z}$ direction within the reference coordinate system. In various embodiments, each translation vector 414 may comprise the coordinates of the optical center of a particular camera according to the reference coordinate system, expressed in the form of a vector. The embodiments are not limited in this context.

Figure 5:
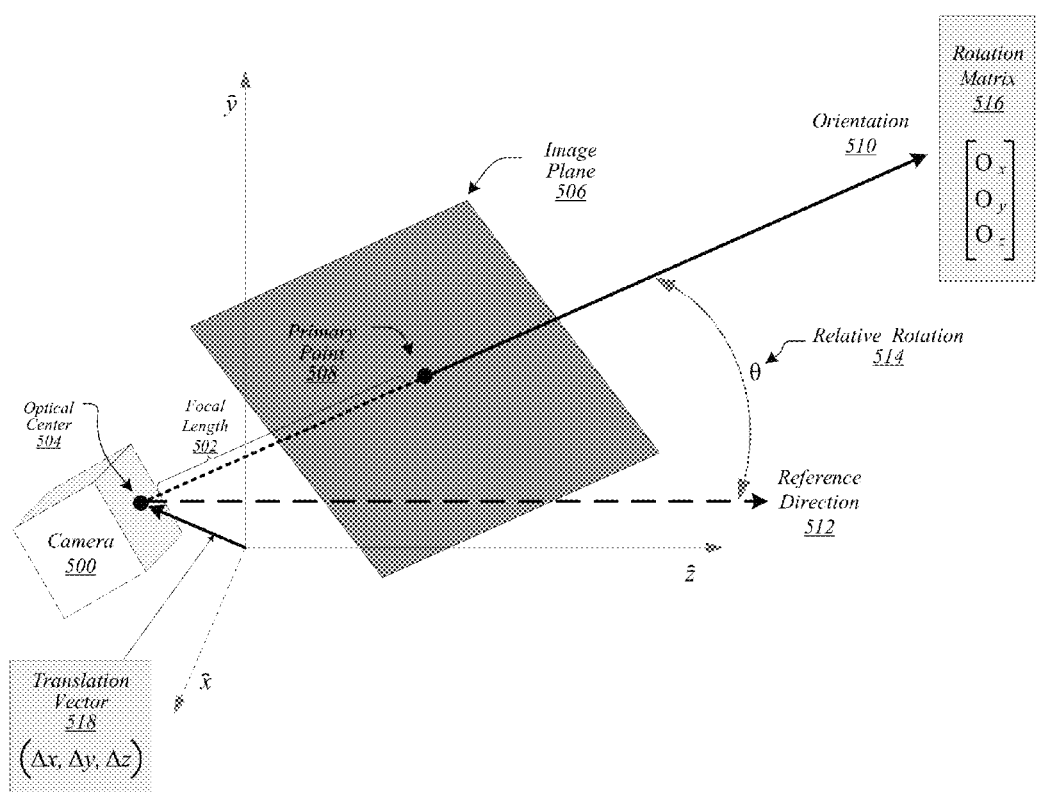
FIG. 5 illustrates an embodiment of an extrinsic parameter determination.

FIG. 5 illustrates an example of a determination of a rotation matrix 516 and a translation vector 518, such as may be representative of a determination performed by imaging management module 406 of FIG. 4. As shown in FIG. 5, a reference coordinate system is defined that comprises $\hat{x}$, $\hat{y}$, and $\hat{z}$ directions. A focal length 502 comprises a line segment extending from the optical center 504 of a camera 500 to the image plane 506 of the camera 500. The focal length 502 is perpendicular to the image plane 506, and intersects the image plane 506 at the primary point 508. The orientation 510 of the camera 500 is defined as the direction represented by the extension of the focal length 502 from the optical center 504 to and past the primary point 508. In this example, the $\hat{z}$ direction of the reference coordinate system is selected as the reference direction 512. The angle θ comprises the relative rotation 514 of the orientation 510 of the camera 500 with respect to the reference direction 512 of the reference coordinate system.

A rotation matrix 516 for the camera 500 indicates the relative rotation 514 by expressing the orientation 510 in the form of a matrix of unit vectors describing the orientation 510 according to the reference coordinate system. In the example of FIG. 5, the rotation matrix 516 for the camera 500 is in a form described by Equation (1) as follows:

$$R_{516}=[O_x, O_y, O_z]^{Tr} \quad (1)$$

where $R_{516}$ represents the rotation matrix 516 for the camera 500, $O_x$, $O_y$, and $O_z$ comprise the unit vector coefficients representing the $\hat{x}$, $\hat{y}$, and $\hat{z}$ components of the orientation 510 according to the reference coordinate system, and Tr represents the vector transpose operation. The embodiments are not limited to this example.

A translation vector 518 for the camera 500 indicates a relative offset, in the $\hat{x}$, $\hat{y}$, and $\hat{z}$ directions, between the position of optical center 504 and the position of the origin of the reference coordinate system. In the example of FIG. 5, the translation vector 518 for the camera 500 is in a form described by Equation (2) as follows:

$$T_{518}=(\Delta x, \Delta y, \Delta z) \quad (2)$$

where $T_{518}$ represents the translation vector 518 for the camera 500, Δx represents the relative offset between optical center 504 and the origin in the $\hat{x}$ direction, Δy represents the relative offset between optical center 504 and the origin in the $\hat{y}$ direction, and Δz represents the relative offset between optical center 504 and the origin in the $\hat{z}$ direction. The embodiments are not limited to this example.

Returning to FIG. 4, in some embodiments, imaging management module 406 may be operative to determine a composite rotation matrix 416 for heterogeneous camera array 450. In various embodiments, the composite rotation matrix 416 may describe a difference between a composite orientation of heterogeneous camera array 450 and the reference orientation of the reference coordinate system. In some embodiments, imaging management module 406 may be operative to determine the composite orientation of heterogeneous camera array 450 based on the translation vectors 414 for the cameras in heterogeneous camera array 450. In various embodiments, imaging management module 406 may be operative to determine the coordinates of the optical centers of the cameras in heterogeneous camera array 450 based on the translation vectors 414, and to determine the composite orientation of heterogeneous camera array 450 based on the determined optical center coordinates. In some embodiments, for an $i^{th}$ camera in heterogeneous camera array 450, the coordinates of the optical center may be of the form $(x_i, y_i, z_i)$, where $x_i$, $y_i$, and $z_i$ represent the coordinates of the $i^{th}$ camera in the respective $\hat{x}$, $\hat{y}$, and $\hat{z}$ directions of the reference coordinate system. In various embodiments, given the rotation matrix 412 and translation vector 414 for the camera, imaging management module 406 may be operative to determine the optical center for the camera according to Equation (3) as follows:

$$c_i = R_i^{Tr} T_i \quad (3)$$

where $c_i$ represents the optical center for the $i^{th}$ camera, $T_i$ represents the translation vector 414 for the $i^{th}$ camera, $R_i$ represents the rotation matrix 412 for the $i^{th}$ camera, and Tr represents the transpose operation. The embodiments are not limited in this context.

In some embodiments in which heterogeneous camera array 450 comprises a linear camera array, imaging management module 406 may be operative to determine a composite orientation and array coordinate system for heterogeneous camera array 450 by fitting a line in 3D space to the optical centers of the camera in heterogeneous camera array 450. For example, with respect to linear camera array 110 of FIG. 1, imaging management module 406 may be operative to determine a composite orientation and array coordinate system by fitting line 108-2 to the respective optical centers 104-4, 104-5, and 104-6 of cameras 102-4, 102-3, and 102-4. In various embodiments, imaging management module 406 may be operative to identify an over-determined system of linear equations for the cameras in heterogeneous camera array 450, and may be operative to determine the line in 3D space by applying least square error minimization techniques to that system of linear equations. In some embodiments, a unit vector along the line may be selected as the $\hat{x}$ direction of the array coordinate system, and a unit vector that is perpendicular to the $\hat{x}$ direction of the array coordinate system and the $\hat{z}$ direction of the reference coordinate system may be selected as the $\hat{y}$ direction of the array coordinate system. The $\hat{z}$ direction of the array coordinate system may be defined as the unit vector that is perpendicular to the $\hat{x}$ and $\hat{y}$ directions of the array coordinate system, and the composite orientation of the heterogeneous camera array 450 may be defined as the $\hat{z}$ direction of the array coordinate system. The embodiments are not limited in this context.

In various embodiments in which heterogeneous camera array 450 comprises a 2D camera array, imaging management module 406 may be operative to determine a composite orientation and array coordinate system for heterogeneous camera array 450 by fitting a set of lines in 3D space to the optical centers of the camera in heterogeneous camera array 450. In some embodiments, the set of lines may comprise a rectilinear grid, in which each line is either perpendicular to or parallel to each other line. For example, with respect to 2D camera array 100 of FIG. 1, imaging management module 406 may be operative to determine a composite orientation and array coordinate system by fitting the rectilinear grid defined by lines 108-1, 108-2, 108-3, 108-4, 108-5, and 108-6 to the arrangement of optical centers 104 comprised in common plane 106. In various embodiments, imaging management module 406 may be operative to identify an over-determined system of linear equations for the cameras in heterogeneous camera array 450, and may be operative to determine the set of lines in 3D space by applying least square error minimization techniques to that system of linear equations. In some embodiments, a unit vector along the lines that more closely correspond to a horizontal dimension in 3D space may be selected as the $\hat{x}$ direction of the array coordinate system, and a unit vector along the lines that are perpendicular to the $\hat{x}$ direction may be selected as the $\hat{y}$ direction of the array coordinate system. The $\hat{z}$ direction of the array coordinate system may be defined as the unit vector that is perpendicular to the $\hat{x}$ and $\hat{y}$ directions of the array coordinate system, and the composite orientation of the heterogeneous camera array 450 may be defined as the $\hat{z}$ direction of the array coordinate system. The embodiments are not limited in this context.

As noted above, in various embodiments, imaging management module 406 may be operative to determine a composite rotation matrix 416 for heterogeneous camera array 450 based on the composite orientation of heterogeneous camera array 450. In some embodiments, the composite rotation matrix 416 may describe a difference between a composite orientation of heterogeneous camera array 450 and the reference orientation of the reference coordinate system. In various embodiments, composite rotation matrix 416 may describe a difference between the $\hat{z}$ direction in the reference coordinate system and the $\hat{z}$ direction in the array coordinate system. In some embodiments, imaging management module 406 may be operative to determine the composite rotation matrix 416 such that when a direction expressed in terms of unit dimensional vectors of the reference coordinate system is multiplied by composite rotation matrix 416, the result will be a vector identifying the direction in terms of the array coordinate system and relative to the composite orientation of the heterogeneous camera array 450. The embodiments are not limited in this context.

In various embodiments, imaging management module 406 may be operative to generate one or more rectification maps 418 based on information determined during the calibration process for heterogeneous camera array 450. In some embodiments, each rectification map 418 may correspond to a particular camera in heterogeneous camera array 450, and may be usable to generate a rectified version of an image captured by that camera. More particularly, each rectification map 418 may comprise information usable to identify, for any particular point in a hypothetical image captured by a given camera, a corresponding point in a rectified version of that hypothetical image. In various embodiments, each rectification map 418 may be associated with the use of a particular resolution and/or FOV in conjunction with rectification of images captured by its corresponding camera. In some embodiments, for each camera in heterogeneous camera array 450, imaging management module 406 may be operative to generate a respective rectification map 418 that corresponds to the native resolution and/or native FOV of that camera. In various embodiments, multiple rectification maps 418 that correspond to different resolutions and/or FOVs may be generated for a same camera. In an example embodiment, a first rectification map 418 may be generated for use in rectifying captured images of a given camera at the native resolution and FOV of that camera, and a second rectification map 418 may be generated for use in rectifying captured images of that camera at a different resolution and/or different FOV. The embodiments are not limited in this context.

In some embodiments, imaging management module 406 may be operative to select one or more reference resolutions and to generate, for each of one or more cameras in heterogeneous camera array 450, respective rectification maps 418 for each of the one or more reference resolutions. In an example embodiment, imaging management module 406 may be operative to select the resolution of a lowest-resolution camera as the reference resolution, and may be operative to generate, for each camera featuring a higher resolution, a rectification map 418 corresponding to the resolution of the lowest-resolution camera. Similarly, in various embodiments, imaging management module 406 may be operative to select one or more reference FOVs and to generate, for each of one or more cameras in heterogeneous camera array 450, respective rectification maps 418 for each of the one or more reference FOVs. In an example embodiment, imaging management module 406 may be operative to identify a smallest FOV among the cameras in heterogeneous camera array 450, select that smallest FOV as the reference FOV, and generate, for each camera featuring a higher resolution, a rectification map 418 corresponding to that smallest FOV. The embodiments are not limited to these examples.

It is to be appreciated that in some embodiments, for a given camera in heterogeneous camera array 450, numerous rectification maps 418 may be generated that correspond to numerous respective combinations of native and non-native resolutions and FOVs. In an example embodiment, for a given camera, imaging management module 406 may be operative to generate a first rectification map 418 corresponding to a native resolution and a native FOV of the camera, a second rectification map 418 corresponding to the native resolution and a reference FOV, a third rectification map 418 corresponding to the native FOV and a reference resolution, and a fourth rectification map 418 corresponding to the reference resolution and the reference FOV. It is further to be appreciated that rectification maps 418 may be generated according to any arbitrary resolution and FOV, and the resolution and/or FOV to which a given rectification map 418 corresponds may or may not comprise an actual resolution and/or FOV of any camera within heterogeneous camera array 450. The embodiments are not limited in this context.

In various embodiments, imaging management module 406 may be operative to generate one or more rectification maps 418 for use in native rectification. As used herein, the term "native rectification" is defined as rectification according to which, for each camera within heterogeneous camera array 450, the respective rectified image that is generated comprises a same resolution and FOV as does the captured image based on which it is derived. In other words, in a native rectification process, the native resolutions and FOVs of the captured images are preserved. In some embodiments, it may be desirable that imaging management module 406 generate a set of rectification maps 418 for use in native rectification in order to enable the application of rectification techniques in a manner that does not relinquish the greater levels of detail provided by cameras featuring higher resolutions and/or wider FOVs. The embodiments are not limited in this context.

In various embodiments, for native rectification of images captured by an camera in heterogeneous camera array 450, imaging management module 406 may be operative to generate a rectification map 418 according to the homography defined by Equations (4) and (5) as follows:

$$m_i = [u\,v\,1]^{Tr} \quad (4)$$

$$m_i^{new} = (K_i R)(K_i R_i)^{-1} m_i^{old} \quad (5)$$

where $m_i$ represents the homogeneous coordinates of pixels on the camera's image plane, u represents the homogenous coordinate in the $\hat{x}$ direction of that image plane, v represents the homogeneous coordinate in the $\hat{y}$ direction of that image plane, Tr represents the transpose operation, $m_i^{new}$ represents the homogeneous coordinates following rectification, $m_i^{old}$ represents the homogeneous coordinates prior to rectification, $K_i$ represents the intrinsic parameter matrix 408 for the camera, $R_i$ represents the rotation matrix 412 for the camera, and R represents the composite rotation matrix 416 for the heterogeneous camera array 450. The embodiments are not limited in this context.

In some embodiments, according to a set of rectification maps 418 that imaging management module 406 generates for use in native rectification, a mapping may be defined between corresponding vertical positions in respective captured images of $i^{th}$ and $j^{th}$ cameras residing in a same row of heterogeneous camera array 450, and may be described by Equation (6) as follows:

$$y_j = \frac{f_{yj}}{f_{yi}} y_i + \left( c_{yj} - \frac{f_{yj}}{f_{yi}} c_{yi} \right) \quad (6)$$

where $y_i$ represents a vertical position in a captured image of the $i^{th}$ camera, $y_j$ represents the corresponding vertical position in a captured image of the $j^{th}$ camera, $f_{yi}$ and $f_{yj}$ represent the respective focal lengths of the $i^{th}$ and $j^{th}$ cameras in the vertical direction, and $c_{yi}$ and $c_{yj}$ represent the vertical coordinates of the respective optical centers of the $i^{th}$ and $j^{th}$ cameras. The embodiments are not limited in this context.

In various embodiments, according to a set of rectification maps 418 that imaging management module 406 generates for use in native rectification, a mapping may be defined between corresponding horizontal positions in respective captured images of and $j^{th}$ cameras residing in a same column of heterogeneous camera array 450, and may be described by Equation (7) as follows:

$$x_j = \frac{f_{xj}}{f_{xi}} x_i + \left( c_{xj} - \frac{f_{xj}}{f_{xi}} c_{xi} \right) \quad (7)$$

where $x_i$ represents a horizontal position in a captured image of the $i^{th}$ camera, $x_j$ represents the corresponding horizontal position in a captured image of the $j^{th}$ camera, $f_{xi}$ and $f_{xj}$ represent the respective focal lengths of the $i^{th}$ and $j^{th}$ cameras in the horizontal direction, and $c_{xi}$ and $c_{xj}$ represent the horizontal coordinates of the respective optical centers of the $i^{th}$ and $j^{th}$ cameras. The embodiments are not limited in this context.

In some embodiments, imaging management module 406 may be operative to generate one or more rectification maps 418 for use in normalized rectification. As used herein, the term "normalized rectification" is defined as rectification according to which, for at least one camera within heterogeneous camera array 450, the respective rectified image that is generated comprises a different resolution and/or different FOV than does the captured image based on which it is derived. In other words, in a normalized rectification process, the resolution and/or FOV of at least one captured image is modified. In various embodiments, imaging management module 406 may be operative to generate a set of rectification maps 418 that is useable, via a normalized rectification process, to convert a set of heterogeneous captured images to a set of rectified images that features a uniform resolution and a uniform FOV. For example, in some embodiments, imaging management module 406 may be operative to generate such a set of rectification maps 418 in order to support and/or simplify the performance of disparity estimation. In various embodiments, each such set of rectification maps 418 may define mappings for normalized rectification according to which, in an obtained rectified image array, corresponding pixels are aligned vertically among images in any particular row, and corresponding pixels are aligned horizontally among images in any particular column. The embodiments are not limited in this context.

In some embodiments, imaging management module 406 may be operative to generate multiple such sets of rectification maps 418, each set usable to obtain a set of rectified images featuring a different respective uniform resolution and/or FOV. For example, in order to support and/or simplify the performance of multi-scale disparity estimation in various embodiments, imaging management module 406 may be operative to generate a first set of rectification maps 418 corresponding to a lowest resolution present among the cameras of heterogeneous camera array 450, and may be operative to generate a second set of rectification maps 418 corresponding to another resolution that is present among the cameras of heterogeneous camera array 450. The embodiments are not limited to this example.

In some embodiments, for each such set of rectification maps 418, imaging management module 406 may be operative to generate a respective composite intrinsic parameter matrix 410 that corresponds to a target resolution and/or target FOV of the normalized rectification for which that set of rectification maps 418 is intended. In various embodiments, imaging management module 406 may be operative to generate each such composite intrinsic parameter matrix 410 based on the intrinsic parameter matrices 408 of cameras that natively feature the target resolution and/or target FOV. Continuing with the previous example, imaging management module 406 may be operative to generate a first composite intrinsic parameter matrix 410 that comprises an average of the intrinsic parameter matrices 408 of the lowest resolution cameras in heterogeneous camera array 450, and may be operative to generate a second composite intrinsic parameter matrix 410 that comprises an average of the intrinsic parameter matrices 408 of the cameras that feature the resolution to which the second set of rectification maps 418 corresponds. The embodiments are not limited to this example.

In some embodiments, for normalized rectification of images captured by an camera in heterogeneous camera array 450, imaging management module 406 may be operative to generate a rectification map 418 according to the homography defined by Equation (4) above and by Equation (8) as follows:

$$m_i^{new} = (KR)(K_i R_i)^{-1} m_i^{old} \quad (8)$$

where $m_i^{new}$ represents the homogeneous coordinates following rectification, $m_i^{old}$ represents the homogeneous coordinates prior to rectification, K represents a composite intrinsic parameter matrix 410 that corresponds to a target resolution and/or FOV for the rectification, $K_i$ represents the intrinsic parameter matrix 408 for the camera, $R_i$ represents the rotation matrix 412 for the $i^{th}$ camera, and R represents the composite rotation matrix 416 for the heterogeneous camera array 450. The embodiments are not limited in this context.

In various embodiments, imaging management module 406 may be operative to perform rectification on a captured image array 452 that is captured by heterogeneous camera array 450, and may thereby obtain one or more rectified image arrays 420. In some embodiments, the rectification may comprise native rectification, normalized rectification, or both. For example, in various embodiments, imaging management module 406 may be operative to perform native rectification on captured image array 452 to obtain a first rectified image array 420, and may be operative to perform one or more normalized rectification processes to obtain one or more additional respective rectified image arrays 420 based on captured image array 452. In some embodiments, imaging management module 406 may be operative to perform each rectification using one or more rectification maps 418. More particularly, in various embodiments, imaging management module 406 may be operative to perform each particular rectification using a respective set of rectification maps 418 that is appropriate for that rectification. In some embodiments, imaging management module 406 may have pre-computed and stored the rectification maps 418 for subsequent use, and may be operative to retrieve the appropriate rectification maps 418 from storage in order to perform the rectification. In various other embodiments, imaging management module 406 may be operative to compute the appropriate rectification maps 418 on-the-fly, as they become needed for use in rectification. In yet other embodiments, imaging management module 406 may be operative to pre-compute and store some rectification maps 418 and operative to compute other rectification maps 418 on-the-fly, as they become needed. The embodiments are not limited in this context.

Figure 6:
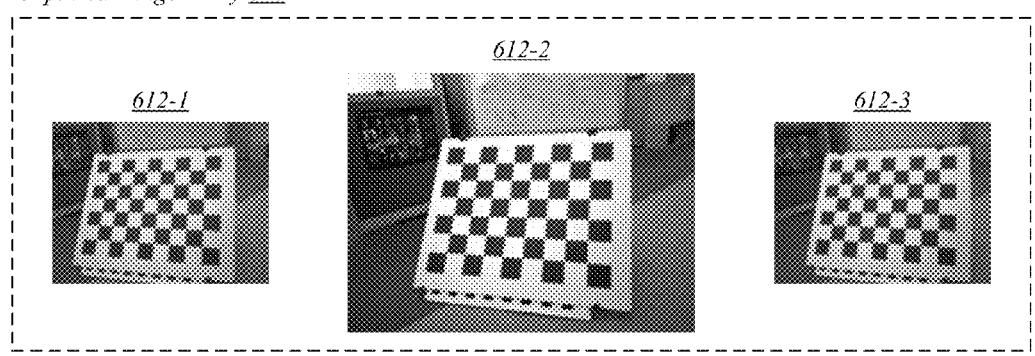
FIG. 6 illustrates an embodiment of a normalized rectification process.
Figure 6:
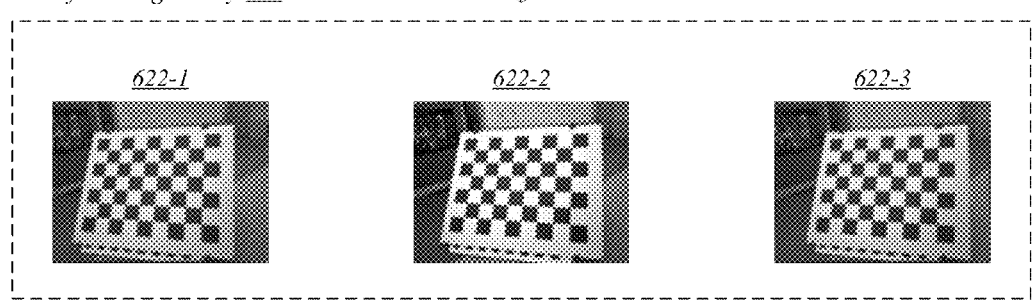

FIG. 6 illustrates an example of a normalized rectification process 600 such as may be representative of some embodiments. More particularly, normalized rectification process 600 comprises an example of a normalized rectification process such as may be performed by imaging management module 406 of FIG. 4 on a captured image array 452 obtained from a linear heterogeneous camera array 450. As shown in FIG. 6, normalized rectification process 600 involves the conversion of a captured image array 610 into a rectified image array 620. Captured image array 610 comprises captured images 612-1, 612-2, and 612-3, each of which may correspond to a respective camera of a linear heterogeneous camera array. Rectified image array 620 comprises rectified images 622-1, 622-2, and 622-3, which comprise rectified versions of captured images 612-1, 612-2, and 612-3, respectively. In captured image array 610, captured image 612-2 comprises a larger resolution and reflects a wider FOV than do captured images 612-1 and 612-3. In the rectified image array 620 obtained via normalized rectification process 600, however, rectified image 622-2 comprises a same resolution and a same FOV as do rectified images 622-1 and 622-3. Further, corresponding pixels in the rectified images in rectified image array 620 reside at the same vertical positions within each of the respective rectified images 622-1, 622-2, and 622-3. In various embodiments, this property may simplify the determination of inter-image correspondences between pixels in the rectified images 622-1, 622-2, and 622-3. Other advantages may be associated with some embodiments, and the embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 7:
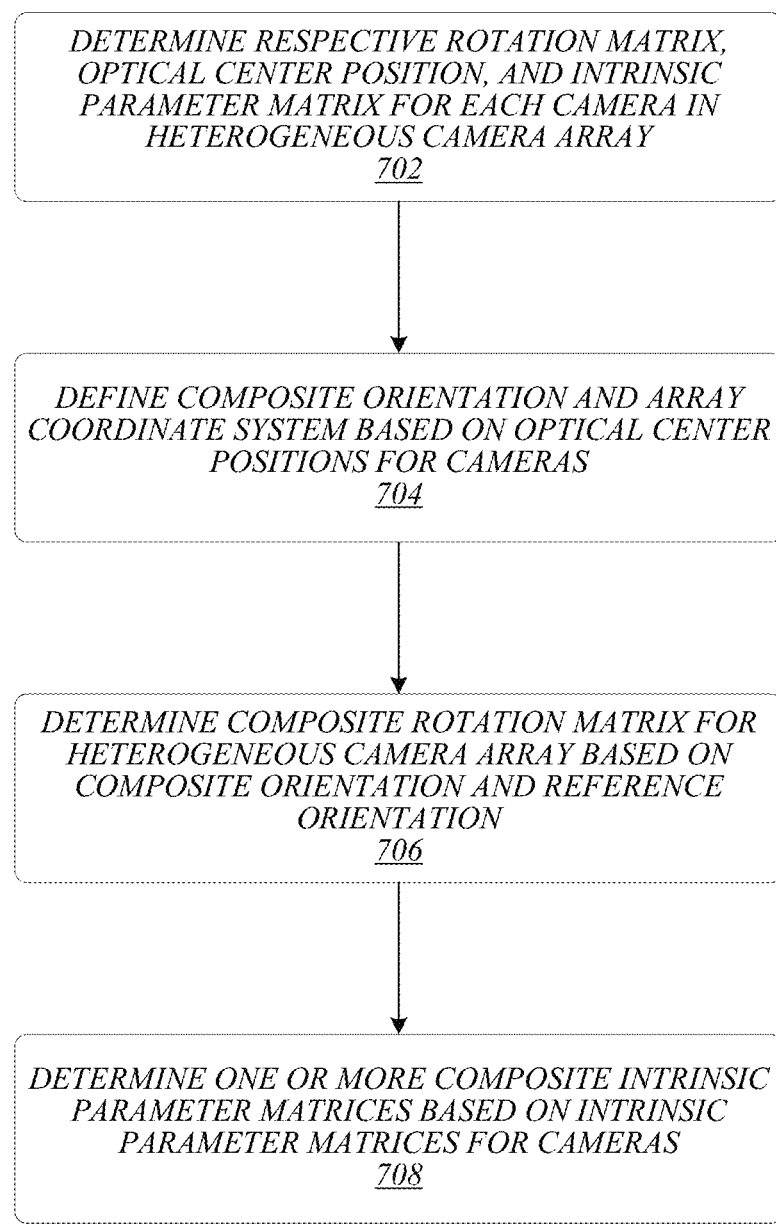
FIG. 7 illustrates an embodiment of a first logic flow.

FIG. 7 illustrates an embodiment of a logic flow 700, which may be representative of the operations executed by one or more embodiments described herein. For example, logic flow 700 may be representative of a calibration process that may be performed in various embodiments by apparatus 400 and/or system 440 of FIG. 4. As shown in logic flow 700, respective rotation matrices, optical center positions, and intrinsic parameter matrices may be determined for each camera in a heterogeneous camera array. For example, imaging management module 406 of FIG. 4 may be operative to determine respective rotation matrices 412, translation vectors 414, and intrinsic parameter matrices 408 for each of the cameras in heterogeneous camera array 450, and may be operative to determine the respective optical center positions for each of those cameras based on their corresponding translation vectors 414.

At 704, a composite orientation and an array coordinate system may be defined for the heterogeneous camera array based on the optical center positions for the cameras in the heterogeneous camera array. For example, imaging management module 406 of FIG. 4 may be operative to determine a composite orientation and an array coordinate system for heterogeneous camera array 450 based on the optical center positions for the cameras within heterogeneous camera array 450. At 706, a composite rotation matrix may be determined for the heterogeneous camera array based on the composite orientation for the heterogeneous camera array and on a reference orientation. For example, imaging management module 406 of FIG. 4 may be operative to determine a composite rotation matrix 416 for heterogeneous camera array 450 by comparing a composite orientation for heterogeneous camera array 450 with a reference orientation of a reference coordinate system. At 708, one or more composite intrinsic parameter matrices may be determined based on the intrinsic parameter matrices for the cameras within the heterogeneous camera array. For example, imaging management module 406 of FIG. 4 may be operative to determine one or more composite intrinsic parameter matrices 410 based on the intrinsic parameter matrices 408 for the cameras within heterogeneous camera array 450. The embodiments are not limited to these examples.

Figure 8:
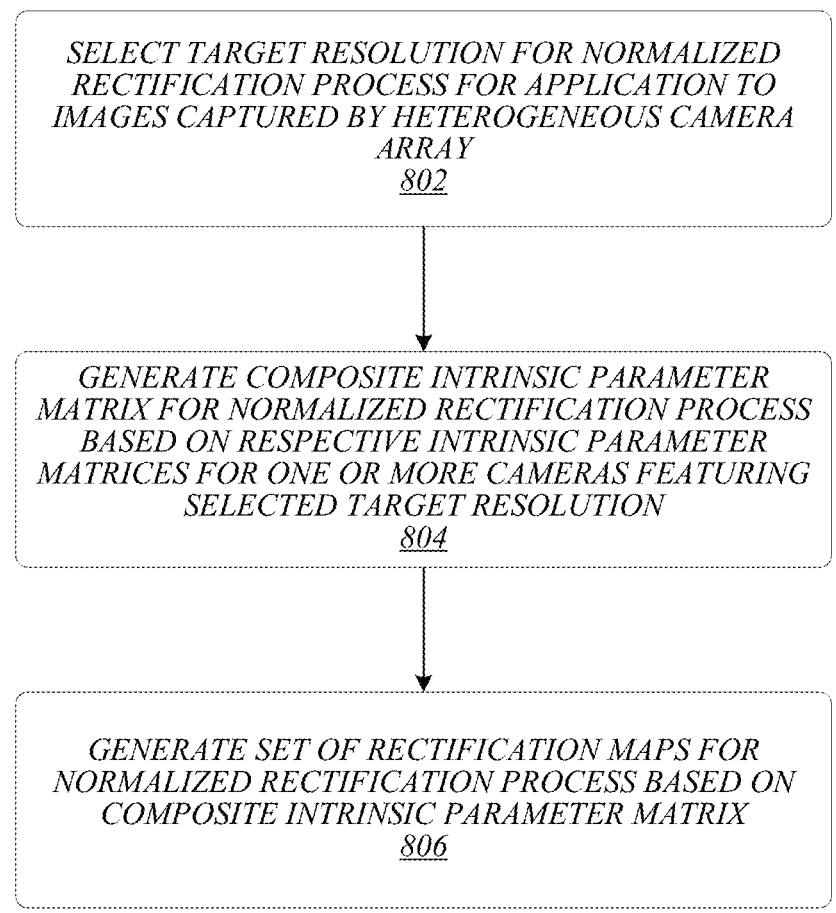
FIG. 8 illustrates an embodiment of a second logic flow.

FIG. 8 illustrates an embodiment of a logic flow 800, which may be representative of the operations executed by one or more embodiments described herein. For example, logic flow 800 may be representative of operations that apparatus 400 and/or system 440 of FIG. 4 may perform in some embodiments in order to enable normalized rectification of a captured image array 452 that may be generated by heterogeneous camera array 450. As shown in logic flow 800, a target resolution may be selected at 802 for a normalized rectification process for application to images captured by a heterogeneous camera array. For example, imaging management module 406 of FIG. 4 may be operative to select a target resolution for a normalized rectification process for potential application to a captured image array 452 that it may receive from heterogeneous camera array 450.

At 804, a composite intrinsic parameter matrix may be generated for the normalized rectification process, based on respective intrinsic parameter matrices for one or more cameras featuring the selected target resolution. For example, imaging management module 406 of FIG. 4 may be operative to generate a composite intrinsic parameter matrix 410 for a normalized rectification process by averaging the intrinsic parameter matrices 408 of cameras in heterogeneous camera array 450 that feature resolutions matching a target resolution for the normalized rectification process. At 806, a set of rectification maps may be generated for the normalized rectification process based on the composite intrinsic parameter matrix. For example, imaging management module 406 of FIG. 4 may be operative to generate a set of rectification maps for a normalized rectification process based on a composite intrinsic parameter matrix 410 that it generated for the normalized rectification process. The embodiments are not limited to these examples.

Figure 9:
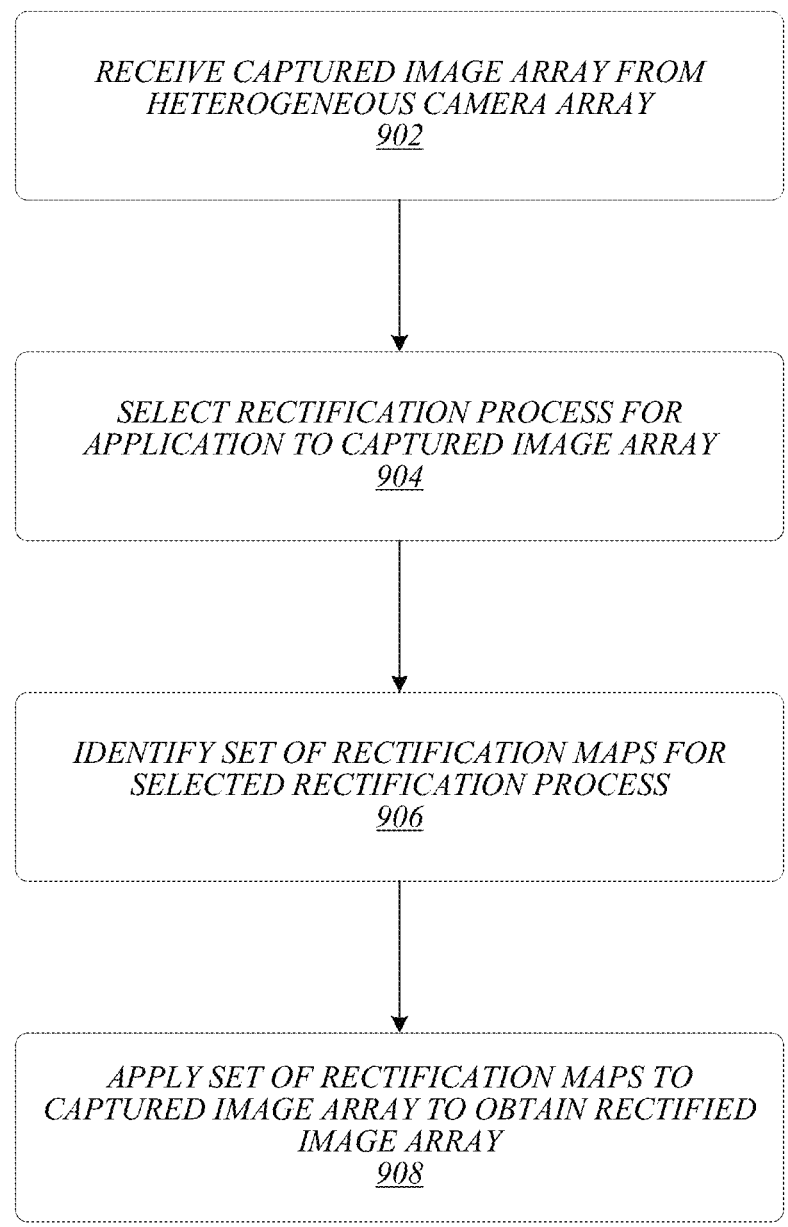
FIG. 9 illustrates an embodiment of a third logic flow.

FIG. 9 illustrates an embodiment of a logic flow 900, which may be representative of the operations executed by one or more embodiments described herein. For example, logic flow 900 may be representative of a rectification process that apparatus 400 and/or system 440 of FIG. 4 may perform in various embodiments. As shown in logic flow 900, a captured image array may be received from a heterogeneous camera array at 902. For example, imaging management module 406 of FIG. 4 may be operative to receive captured image array 452 from heterogeneous camera array 450. At 904, a rectification process may be selected for application to the captured image array. For example, imaging management module 406 of FIG. 4 may be operative to select either a native rectification process or a normalized rectification process for application to captured image array 452. At 906, a set of rectification maps may be identified for the selected rectification process. For example, imaging management module 406 of FIG. 4 may be operative to identify a set of rectification maps 418 for a rectification process that it selects at 904. At 908, the set of rectification maps may be applied to the captured image array to obtain a rectified image array. For example, imaging management module 406 may be operative to apply a selected set of rectification maps 418 to captured image array 452 in order to obtain a rectified image array 420. The embodiments are not limited to these examples.

Figure 10:
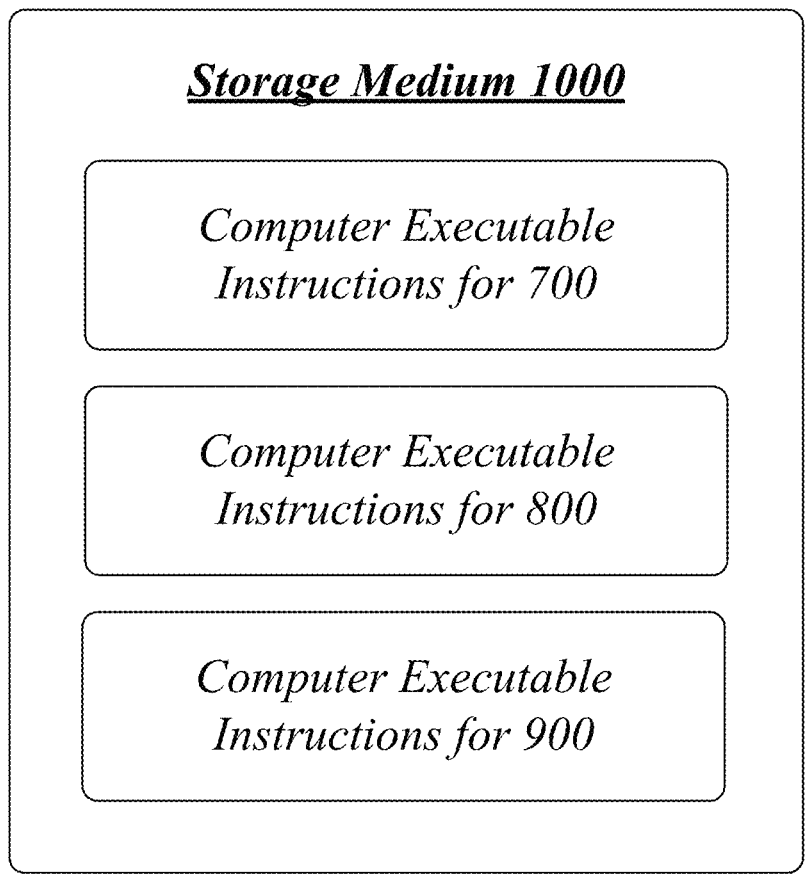
FIG. 10 illustrates an embodiment of a storage medium.

FIG. 10 illustrates an embodiment of a storage medium 1000. Storage medium 1000 may comprise any non-transitory computer-readable storage medium or machine-readable storage medium, such as an optical, magnetic or semiconductor storage medium. In various embodiments, storage medium 1000 may comprise an article of manufacture. In some embodiments, storage medium 1000 may store computer-executable instructions, such as computer-executable instructions to implement logic flow 700 of FIG. 7, logic flow 800 of FIG. 8, and/or logic flow 900 of FIG. 9. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 11:
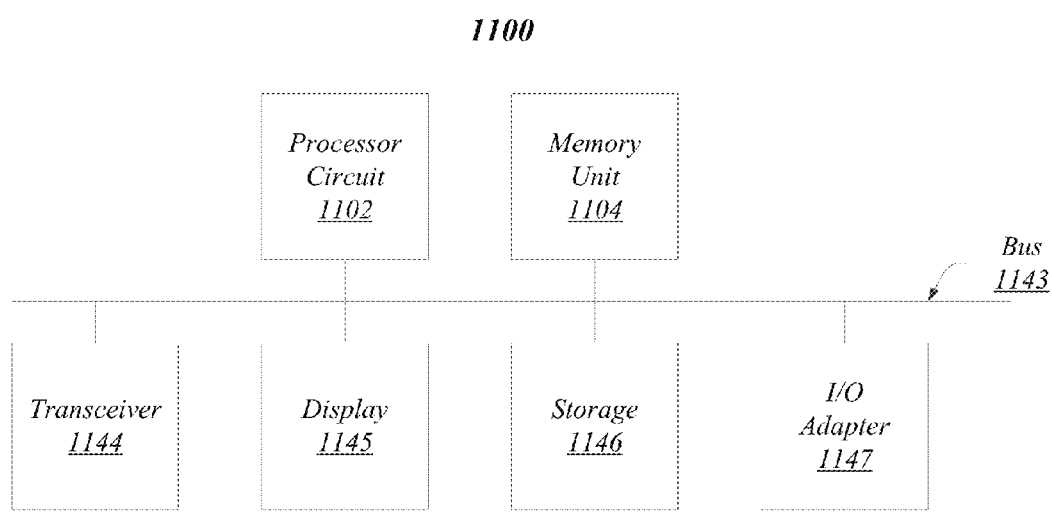
FIG. 11 illustrates an embodiment of a second system.

FIG. 11 illustrates one embodiment of a system 1100. In various embodiments, system 1100 may be representative of a system or architecture suitable for use with one or more embodiments described herein, such as apparatus 400 and/or system 440 of FIG. 4, logic flow 700 of FIG. 7, logic flow 800 of FIG. 8, logic flow 900 of FIG. 9, and/or storage medium 1000 of FIG. 10. The embodiments are not limited in this respect.

As shown in FIG. 11, system 1100 may include multiple elements. One or more elements may be implemented using one or more circuits, components, registers, processors, software subroutines, modules, or any combination thereof, as desired for a given set of design or performance constraints. Although FIG. 11 shows a limited number of elements in a certain topology by way of example, it can be appreciated that more or less elements in any suitable topology may be used in system 1100 as desired for a given implementation. The embodiments are not limited in this context.

In various embodiments, system 1100 may include a processor circuit 1102. Processor circuit 1102 may be implemented using any processor or logic device, and may be the same as or similar to processor circuit 402 of FIG. 4.

In one embodiment, system 1100 may include a memory unit 1104 to couple to processor circuit 1102. Memory unit 1104 may be coupled to processor circuit 1102 via communications bus 1143, or by a dedicated communications bus between processor circuit 1102 and memory unit 1104, as desired for a given implementation. Memory unit 1104 may be implemented using any machine-readable or computer-readable media capable of storing data, including both volatile and non-volatile memory, and may be the same as or similar to memory unit 404 of FIG. 4. In some embodiments, the machine-readable or computer-readable medium may include a non-transitory medium. The embodiments are not limited in this context.

In various embodiments, system 1100 may include an RF transceiver 1144. RF transceiver 1144 may include one or more radios capable of transmitting and receiving signals using various suitable wireless communications techniques, and may be the same as or similar to RF transceiver 442 of FIG. 4.

In various embodiments, system 1100 may include a display 1145. Display 1145 may comprise any display device capable of displaying information received from processor circuit 1102, and may be the same as or similar to display 446 of FIG. 4. The embodiments are not limited in this context.

In various embodiments, system 1100 may include storage 1146. Storage 1146 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1146 may include technology to increase the storage performance enhanced protection for valuable digital media when multiple hard drives are included, for example. Further examples of storage 1146 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 1100 may include one or more I/O adapters 1147. Examples of I/O adapters 1147 may include Universal Serial Bus (USB) ports/adapters, IEEE 1394 Firewire ports/adapters, and so forth. The embodiments are not limited in this context.

Figure 12:
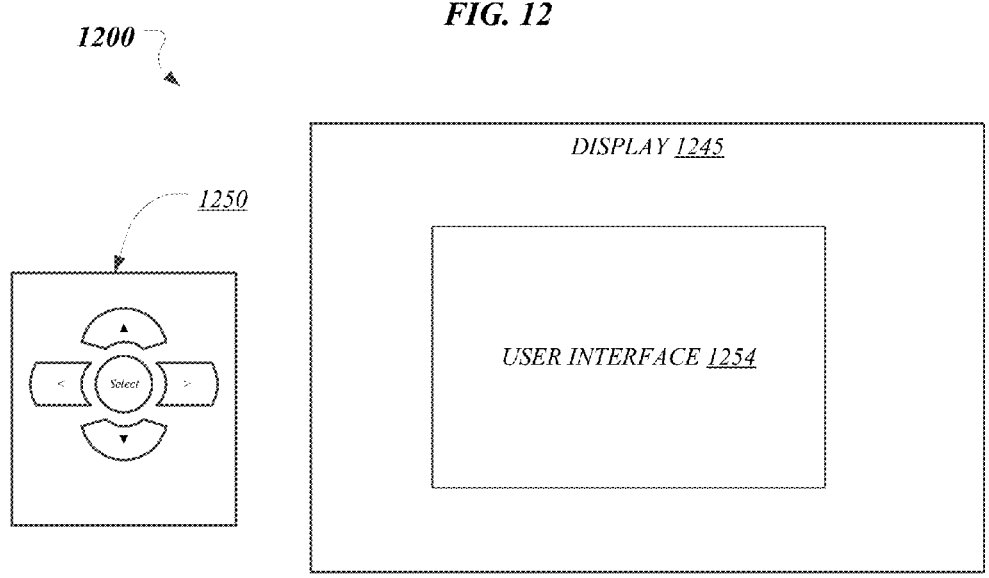
FIG. 12 illustrates an embodiment of a third system.
Figure 12:
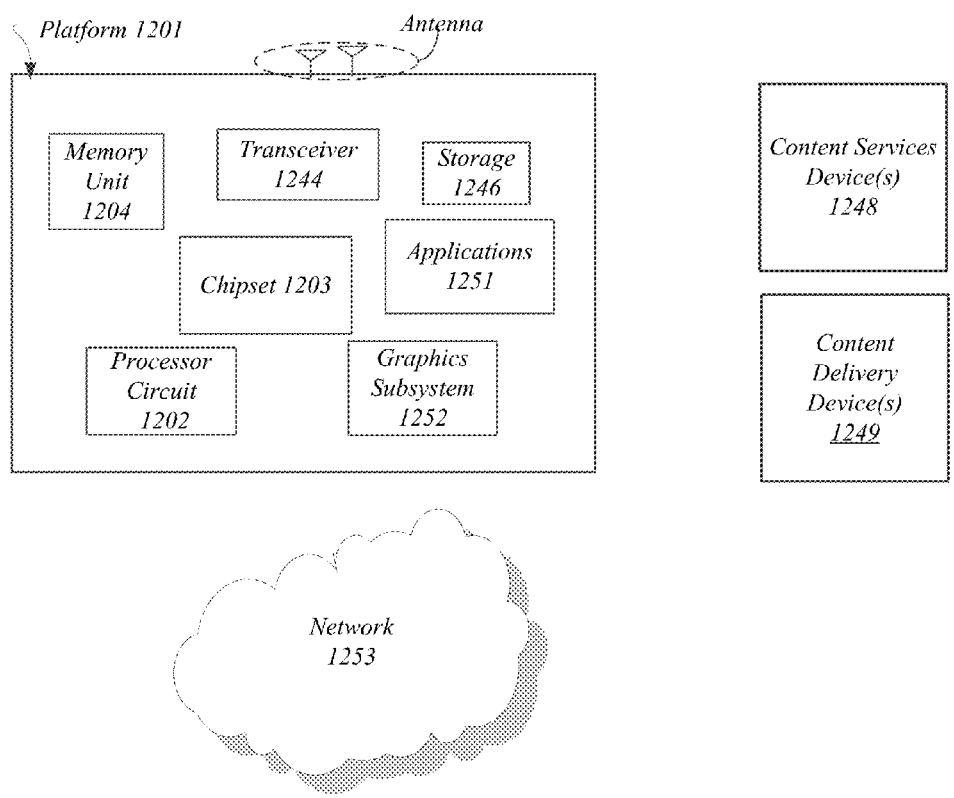

FIG. 12 illustrates an embodiment of a system 1200. In various embodiments, system 1200 may be representative of a system or architecture suitable for use with one or more embodiments described herein, such as apparatus 400 and/or system 440 of FIG. 4, logic flow 700 of FIG. 7, logic flow 800 of FIG. 8, logic flow 900 of FIG. 9, storage medium 1000 of FIG. 10, and/or system 1100 of FIG. 11. The embodiments are not limited in this respect.

As shown in FIG. 12, system 1200 may include multiple elements. One or more elements may be implemented using one or more circuits, components, registers, processors, software subroutines, modules, or any combination thereof, as desired for a given set of design or performance constraints. Although FIG. 12 shows a limited number of elements in a certain topology by way of example, it can be appreciated that more or less elements in any suitable topology may be used in system 1200 as desired for a given implementation. The embodiments are not limited in this context.

In embodiments, system 1200 may be a media system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1200 includes a platform 1201 coupled to a display 1245. Platform 1201 may receive content from a content device such as content services device(s) 1248 or content delivery device(s) 1249 or other similar content sources. A navigation controller 1250 including one or more navigation features may be used to interact with, for example, platform 1201 and/or display 1245. Each of these components is described in more detail below.

In embodiments, platform 1201 may include any combination of a processor circuit 1202, chipset 1203, memory unit 1204, transceiver 1244, storage 1246, applications 1251, and/or graphics subsystem 1252. Chipset 1203 may provide intercommunication among processor circuit 1202, memory unit 1204, transceiver 1244, storage 1246, applications 1251, and/or graphics subsystem 1252. For example, chipset 1203 may include a storage adapter (not depicted) capable of providing intercommunication with storage 1246.

Processor circuit 1202 may be implemented using any processor or logic device, and may be the same as or similar to processor circuit 1102 in FIG. 11.

Memory unit 1204 may be implemented using any machine-readable or computer-readable media capable of storing data, and may be the same as or similar to memory unit 1104 in FIG. 11.

Transceiver 1244 may include one or more radios capable of transmitting and receiving signals using various suitable wireless communications techniques, and may be the same as or similar to transceiver 1144 in FIG. 11.

Display 1245 may include any television type monitor or display, and may be the same as or similar to display 1145 in FIG. 11.

Storage 1246 may be implemented as a non-volatile storage device, and may be the same as or similar to storage 1146 in FIG. 11.

Graphics subsystem 1252 may perform processing of images such as still or video for display. Graphics subsystem 1252 may be a graphics processing unit (GPU) or a visual processing unit (VPU), for example. An analog or digital interface may be used to communicatively couple graphics subsystem 1252 and display 1245. For example, the interface may be any of a High-Definition Multimedia Interface, DisplayPort, wireless HDMI, and/or wireless HD compliant techniques. Graphics subsystem 1252 could be integrated into processor circuit 1202 or chipset 1203. Graphics subsystem 1252 could be a stand-alone card communicatively coupled to chipset 1203.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 1248 may be hosted by any national, international and/or independent service and thus accessible to platform 1201 via the Internet, for example. Content services device(s) 1248 may be coupled to platform 1201 and/or to display 1245. Platform 1201 and/or content services device(s) 1248 may be coupled to a network 1253 to communicate (e.g., send and/or receive) media information to and from network 1253. Content delivery device(s) 1249 also may be coupled to platform 1201 and/or to display 1245.

In embodiments, content services device(s) 1248 may include a cable television box, personal computer, network, telephone, Internet enabled devices or appliance capable of delivering digital information and/or content, and any other similar device capable of unidirectionally or bidirectionally communicating content between content providers and platform 1201 and/display 1245, via network 1253 or directly. It will be appreciated that the content may be communicated unidirectionally and/or bidirectionally to and from any one of the components in system 1200 and a content provider via network 1253. Examples of content may include any media information including, for example, video, music, medical and gaming information, and so forth.

Content services device(s) 1248 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 1201 may receive control signals from navigation controller 1250 having one or more navigation features. The navigation features of navigation controller 1250 may be used to interact with a user interface 1254, for example. In embodiments, navigation controller 1250 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1250 may be echoed on a display (e.g., display 1245) by movements of a pointer, cursor, focus ring, or other visual indicators displayed on the display. For example, under the control of software applications 1251, the navigation features located on navigation controller 1250 may be mapped to virtual navigation features displayed on user interface 1254. In embodiments, navigation controller 1250 may not be a separate component but integrated into platform 1201 and/or display 1245. Embodiments, however, are not limited to the elements or in the context shown or described herein.

In embodiments, drivers (not shown) may include technology to enable users to instantly turn on and off platform 1201 like a television with the touch of a button after initial boot-up, when enabled, for example. Program logic may allow platform 1201 to stream content to media adaptors or other content services device(s) 1248 or content delivery device(s) 1249 when the platform is turned "off" In addition, chip set 1203 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 1200 may be integrated. For example, platform 1201 and content services device(s) 1248 may be integrated, or platform 1201 and content delivery device(s) 1249 may be integrated, or platform 1201, content services device(s) 1248, and content delivery device(s) 1249 may be integrated, for example. In various embodiments, platform 1201 and display 1245 may be an integrated unit. Display 1245 and content service device(s) 1248 may be integrated, or display 1245 and content delivery device(s) 1249 may be integrated, for example. These examples are not meant to limit the disclosed subject matter.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1201 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
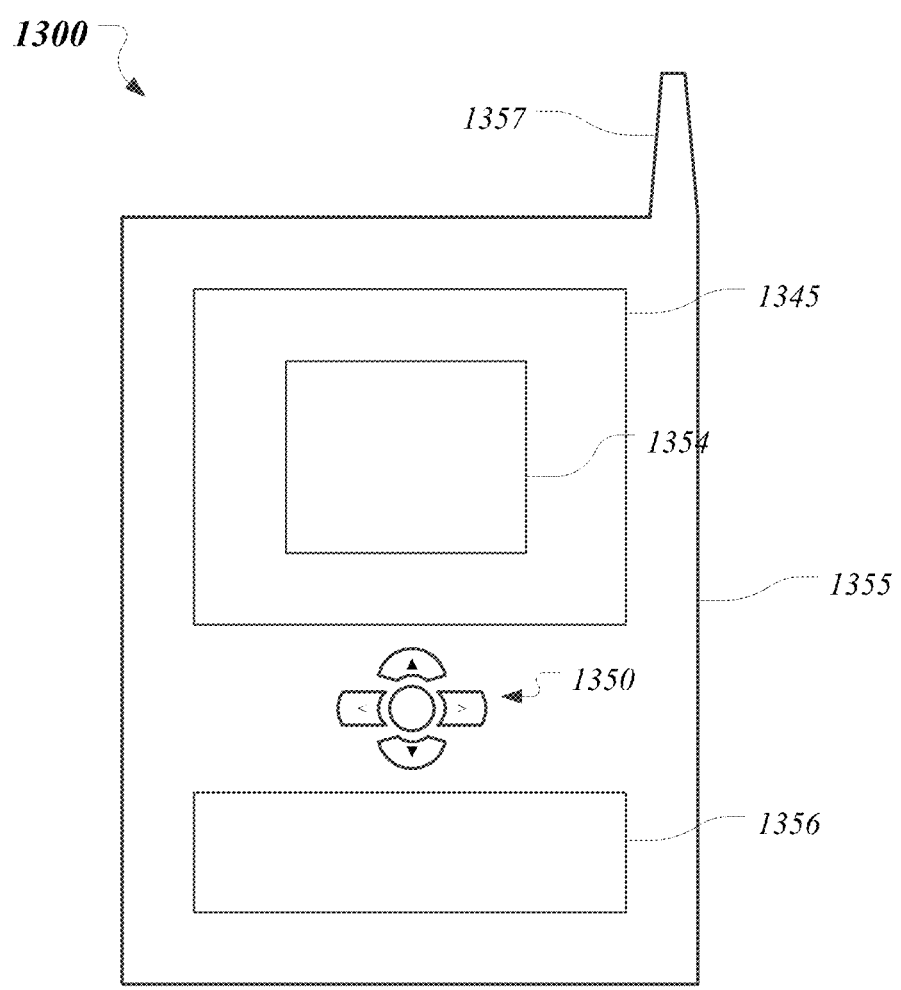
FIG. 13 illustrates an embodiment of a device.

As described above, system 1200 may be embodied in varying physical styles or form factors. FIG. 13 illustrates embodiments of a small form factor device 1300 in which system 1200 may be embodied. In embodiments, for example, device 1300 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 1300 may include a display 1345, a navigation controller 1350, a user interface 1354, a housing 1355, an I/O device 1356, and an antenna 1357. Display 1345 may include any suitable display unit for displaying information appropriate for a mobile computing device, and may be the same as or similar to display 1245 in FIG. 12. Navigation controller 1350 may include one or more navigation features which may be used to interact with user interface 1354, and may be the same as or similar to navigation controller 1250 in FIG. 12. I/O device 1356 may include any suitable I/O device for entering information into a mobile computing device. Examples for I/O device 1356 may include an alphanumeric keyboard, a numeric keypad, a touch pad, input keys, buttons, switches, rocker switches, microphones, speakers, voice recognition device and software, and so forth. Information also may be entered into device 1300 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an image processing apparatus, comprising logic, at least a portion of which is in hardware, the logic to receive a captured image array generated by a heterogeneous camera array, select a rectification process for application to the captured image array, identify a set of rectification maps for the selected rectification process, and apply the identified set of rectification maps to the captured image array to obtain a rectified image array.

In Example 2, the logic of Example 1 may optionally generate the identified set of rectification maps in response to the selection of the rectification process.

In Example 3, the logic of Example 1 may optionally retrieve the identified set of rectification maps from among a plurality of pre-computed rectification maps stored in a memory unit in response to the selection of the rectification process.

In Example 4, the logic of any of Examples 1 to 3 may optionally perform a calibration process comprising determining respective rotation matrices and intrinsic parameter matrices for each of a plurality of cameras in the heterogeneous camera array and determining a composite rotation matrix for the heterogeneous camera array.

In Example 5, the calibration process of Example 4 may optionally comprise storing the composite rotation matrix and the respective rotation matrices and intrinsic parameter matrices in a memory unit prior to receipt of the captured image array.

In Example 6, the selected rectification process of any of Examples 4 to 5 may optionally comprise a native rectification process according to which resolutions and fields-of-view for images in the rectified image array match resolutions and fields-of-view for corresponding images in the captured image array.

In Example 7, the set of rectification maps of Example 6 may optionally be generated based on the respective rotation matrices and intrinsic parameter matrices for the plurality of cameras in the heterogeneous camera array and on the composite rotation matrix for the heterogeneous camera array.

In Example 8, the selected rectification process of any of Examples 4 to 5 may optionally comprise a normalized rectification process according to which images in the rectified image array comprise a uniform resolution and a uniform field-of-view.

In Example 9, the set of rectification maps of Example 8 may optionally be generated based on the respective rotation matrices and intrinsic parameter matrices for the plurality of cameras in the heterogeneous camera array, on the composite rotation matrix for the heterogeneous camera array, and on a composite intrinsic parameter matrix.

In Example 10, the calibration process of Example 9 may optionally comprise determining the composite intrinsic parameter matrix based on the respective intrinsic parameter matrices for the plurality of cameras in the heterogeneous camera array.

In Example 11, the calibration process of any of Examples 9 to 10 may optionally comprise storing the composite intrinsic parameter matrix in a memory unit prior to receipt of the captured image array.

In Example 12, the set of rectification maps of any of Examples 9 to 11 may optionally correspond to a target resolution and a target field-of-view for the normalized rectification process.

In Example 13, the calibration process of Example 12 may optionally comprise determining the composite intrinsic parameter matrix based on respective intrinsic parameter matrices for one or more cameras in the heterogeneous camera array that feature the target resolution and the target field of view.

In Example 14, the calibration process of Example 13 may optionally comprise determining the composite intrinsic parameter matrix by averaging respective intrinsic parameter matrices for two or more cameras in the heterogeneous camera array that feature the target resolution and the target field of view.

In Example 15, the calibration process of any of Examples 4 to 14 may optionally comprise determining a composite orientation of the heterogeneous camera array and determining the composite rotation matrix for the heterogeneous camera array based on the composite orientation of the heterogeneous camera array.

In Example 16, the calibration process of Example 15 may optionally comprise determining respective optical center positions for each of the plurality of cameras in the heterogeneous camera array and determining the composite orientation of the heterogeneous camera array based on the optical center positions.

In Example 17, the heterogeneous camera array of Example 16 may optionally comprise a linear camera array.

In Example 18, the calibration process of Example 17 may optionally comprise fitting a line to the optical center positions for each of the plurality of cameras in the heterogeneous camera array and determining the composite orientation of the heterogeneous camera array based on the line.

In Example 19, the heterogeneous camera array of Example 16 may optionally comprise a two-dimensional (2D) camera array.

In Example 20, the calibration process of Example 19 may optionally comprise fitting a set of lines to the optical center positions for each of the plurality of cameras in the heterogeneous camera array and determining the composite orientation of the heterogeneous camera array based on the set of lines.

Example 21 is a system, comprising an image processing apparatus according to any of Examples 1 to 20, a display, a radio frequency (RF) transceiver, and one or more RF antennas.

Example 22 is at least one non-transitory computer-readable storage medium comprising a set of image processing instructions that, in response to being executed on a computing device, cause the computing device to receive a captured image array generated by a heterogeneous camera array, select a rectification process for application to the captured image array, identify a set of rectification maps for the selected rectification process, and apply the identified set of rectification maps to the captured image array to obtain a rectified image array.

In Example 23, the at least one non-transitory computer-readable storage medium of Example 22 may optionally comprise image processing instructions that, in response to being executed on the computing device, cause the computing device to generate the identified set of rectification maps in response to the selection of the rectification process.

In Example 24, the at least one non-transitory computer-readable storage medium of Example 22 may optionally comprise image processing instructions that, in response to being executed on the computing device, cause the computing device to retrieve the identified set of rectification maps from among a plurality of pre-computed rectification maps stored in a memory unit in response to the selection of the rectification process.

In Example 25, the at least one non-transitory computer-readable storage medium of any of Examples 22 to 24 may optionally comprise image processing instructions that, in response to being executed on the computing device, cause the computing device to perform a calibration process comprising determining respective rotation matrices and intrinsic parameter matrices for each of a plurality of cameras in the heterogeneous camera array and determining a composite rotation matrix for the heterogeneous camera array.

In Example 26, the calibration process of Example 25 may optionally comprise storing the composite rotation matrix and the respective rotation matrices and intrinsic parameter matrices in a memory unit prior to receipt of the captured image array.

In Example 27, the selected rectification process of any of Examples 25 to 26 may optionally comprise a native rectification process according to which resolutions and fields-of-view for images in the rectified image array match resolutions and fields-of-view for corresponding images in the captured image array.

In Example 28, the set of rectification maps of Example 27 may optionally be generated based on the respective rotation matrices and intrinsic parameter matrices for the plurality of cameras in the heterogeneous camera array and on the composite rotation matrix for the heterogeneous camera array.

In Example 29, the selected rectification process of any of Examples 25 to 26 may optionally comprise a normalized rectification process according to which images in the rectified image array comprise a uniform resolution and a uniform field-of-view.

In Example 30, the set of rectification maps of Example 30 may optionally be generated based on the respective rotation matrices and intrinsic parameter matrices for the plurality of cameras in the heterogeneous camera array, on the composite rotation matrix for the heterogeneous camera array, and on a composite intrinsic parameter matrix.

In Example 31, the calibration process of Example 30 may optionally comprise determining the composite intrinsic parameter matrix based on the respective intrinsic parameter matrices for the plurality of cameras in the heterogeneous camera array.

In Example 32, the calibration process of any of Examples 30 to 31 may optionally comprise storing the composite intrinsic parameter matrix in a memory unit prior to receipt of the captured image array.

In Example 33, the set of rectification maps of any of Examples 30 to 32 may optionally correspond to a target resolution and a target field-of-view for the normalized rectification process.

In Example 34, the calibration process of Example 33 may optionally comprise determining the composite intrinsic parameter matrix based on respective intrinsic parameter matrices for one or more cameras in the heterogeneous camera array that feature the target resolution and the target field of view.

In Example 35, the calibration process of Example 34 may optionally comprise determining the composite intrinsic parameter matrix by averaging respective intrinsic parameter matrices for two or more cameras in the heterogeneous camera array that feature the target resolution and the target field of view.

In Example 36, the calibration process of any of Examples 25 to 35 may optionally comprise determining a composite orientation of the heterogeneous camera array and determining the composite rotation matrix for the heterogeneous camera array based on the composite orientation of the heterogeneous camera array.

In Example 37, the calibration process of Example 36 may optionally comprise determining respective optical center positions for each of the plurality of cameras in the heterogeneous camera array and determining the composite orientation of the heterogeneous camera array based on the optical center positions.

In Example 38, the heterogeneous camera array of Example 37 may optionally comprise a linear camera array.

In Example 39, the calibration process of Example 38 may optionally comprise fitting a line to the optical center positions for each of the plurality of cameras in the heterogeneous camera array and determining the composite orientation of the heterogeneous camera array based on the line.

In Example 40, the heterogeneous camera array of Example 37 may optionally comprise a two-dimensional (2D) camera array.

In Example 41, the calibration process of Example 40 may optionally comprise fitting a set of lines to the optical center positions for each of the plurality of cameras in the heterogeneous camera array and determining the composite orientation of the heterogeneous camera array based on the set of lines.

Example 42 is an image processing method, comprising receiving a captured image array generated by a heterogeneous camera array, selecting, by a processor circuit, a rectification process for application to the captured image array, identifying a set of rectification maps for the selected rectification process, and applying the identified set of rectification maps to the captured image array to obtain a rectified image array.

In Example 43, the image processing method of Example 42 may optionally comprise generating the identified set of rectification maps in response to the selection of the rectification process.

In Example 44, the image processing method of Example 42 may optionally comprise retrieving the identified set of rectification maps from among a plurality of pre-computed rectification maps stored in a memory unit in response to the selection of the rectification process.

In Example 45, the image processing method of any of Examples 42 to 44 may optionally comprise performing a calibration process comprising determining respective rotation matrices and intrinsic parameter matrices for each of a plurality of cameras in the heterogeneous camera array and determining a composite rotation matrix for the heterogeneous camera array.

In Example 46, the calibration process of Example 45 may optionally comprise storing the composite rotation matrix and the respective rotation matrices and intrinsic parameter matrices in a memory unit prior to receipt of the captured image array.

In Example 47, the selected rectification process of any of Examples 45 to 46 may optionally comprise a native rectification process according to which resolutions and fields-of-view for images in the rectified image array match resolutions and fields-of-view for corresponding images in the captured image array.

In Example 48, the set of rectification maps of Example 47 may optionally be generated based on the respective rotation matrices and intrinsic parameter matrices for the plurality of cameras in the heterogeneous camera array and on the composite rotation matrix for the heterogeneous camera array.

In Example 49, the selected rectification process of any of Examples 45 to 46 may optionally comprise a normalized rectification process according to which images in the rectified image array comprise a uniform resolution and a uniform field-of-view.

In Example 50, the set of rectification maps of Example 49 may optionally be generated based on the respective rotation matrices and intrinsic parameter matrices for the plurality of cameras in the heterogeneous camera array, on the composite rotation matrix for the heterogeneous camera array, and on a composite intrinsic parameter matrix.

In Example 51, the calibration process of Example 50 may optionally comprise determining the composite intrinsic parameter matrix based on the respective intrinsic parameter matrices for the plurality of cameras in the heterogeneous camera array.

In Example 52, the calibration process of any of Examples 50 to 51 may optionally comprise storing the composite intrinsic parameter matrix in a memory unit prior to receipt of the captured image array.

In Example 53, the set of rectification maps of any of Examples 50 to 52 may optionally correspond to a target resolution and a target field-of-view for the normalized rectification process.

In Example 54, the calibration process of Example 53 may optionally comprise determining the composite intrinsic parameter matrix based on respective intrinsic parameter matrices for one or more cameras in the heterogeneous camera array that feature the target resolution and the target field of view.

In Example 55, the calibration process of Example 54 may optionally comprise determining the composite intrinsic parameter matrix by averaging respective intrinsic parameter matrices for two or more cameras in the heterogeneous camera array that feature the target resolution and the target field of view.

In Example 56, the calibration process of any of Examples 45 to 55 may optionally comprise determining a composite orientation of the heterogeneous camera array and determining the composite rotation matrix for the heterogeneous camera array based on the composite orientation of the heterogeneous camera array.

In Example 57, the calibration process of Example 56 may optionally comprise determining respective optical center positions for each of the plurality of cameras in the heterogeneous camera array and determining the composite orientation of the heterogeneous camera array based on the optical center positions.

In Example 58, the heterogeneous camera array of Example 57 may optionally comprise a linear camera array.

In Example 59, the calibration process of Example 58 may optionally comprise fitting a line to the optical center positions for each of the plurality of cameras in the heterogeneous camera array and determining the composite orientation of the heterogeneous camera array based on the line.

In Example 60, the heterogeneous camera array of Example 57 may optionally comprise a two-dimensional (2D) camera array.

In Example 61, the calibration process of Example 60 may optionally comprise fitting a set of lines to the optical center positions for each of the plurality of cameras in the heterogeneous camera array and determining the composite orientation of the heterogeneous camera array based on the set of lines.

Example 62 is at least one non-transitory computer-readable storage medium comprising a set of instructions that, in response to being executed on a computing device, cause the computing device to perform an image processing method according to any of Examples 42 to 61.

Example 63 is an apparatus, comprising means for performing an image processing method according to any of Examples 42 to 61.

Example 64 is a system, comprising an apparatus according to Example 63, a display, a radio frequency (RF) transceiver, and one or more RF antennas.

Example 65 is an image processing apparatus, comprising means for receiving a captured image array generated by a heterogeneous camera array, means for selecting a rectification process for application to the captured image array, means for identifying a set of rectification maps for the selected rectification process, and means for applying the identified set of rectification maps to the captured image array to obtain a rectified image array.

In Example 66, the image processing apparatus of Example 65 may optionally comprise means for generating the identified set of rectification maps in response to the selection of the rectification process.

In Example 67, the image processing apparatus of Example 65 may optionally comprise means for retrieving the identified set of rectification maps from among a plurality of pre-computed rectification maps stored in a memory unit in response to the selection of the rectification process.

In Example 68, the image processing apparatus of any of Examples 65 to 67 may optionally comprise means for performing a calibration process comprising determining respective rotation matrices and intrinsic parameter matrices for each of a plurality of cameras in the heterogeneous camera array and determining a composite rotation matrix for the heterogeneous camera array.

In Example 69, the calibration process of Example 68 may optionally comprise storing the composite rotation matrix and the respective rotation matrices and intrinsic parameter matrices in a memory unit prior to receipt of the captured image array.

In Example 70, the selected rectification process of any of Examples 68 to 69 may optionally comprise a native rectification process according to which resolutions and fields-of-view for images in the rectified image array match resolutions and fields-of-view for corresponding images in the captured image array.

In Example 71, the set of rectification maps of Example 70 may optionally be generated based on the respective rotation matrices and intrinsic parameter matrices for the plurality of cameras in the heterogeneous camera array and on the composite rotation matrix for the heterogeneous camera array.

In Example 72, the selected rectification process of any of Examples 68 to 69 may optionally comprise a normalized rectification process according to which images in the rectified image array comprise a uniform resolution and a uniform field-of-view.

In Example 73, the set of rectification maps of Example 72 may optionally be generated based on the respective rotation matrices and intrinsic parameter matrices for the plurality of cameras in the heterogeneous camera array, on the composite rotation matrix for the heterogeneous camera array, and on a composite intrinsic parameter matrix.

In Example 74, the calibration process of Example 73 may optionally comprise determining the composite intrinsic parameter matrix based on the respective intrinsic parameter matrices for the plurality of cameras in the heterogeneous camera array.

In Example 75, the calibration process of any of Examples 73 to 74 may optionally comprise storing the composite intrinsic parameter matrix in a memory unit prior to receipt of the captured image array.

In Example 76, the set of rectification maps of any of Examples 73 to 75 may optionally correspond to a target resolution and a target field-of-view for the normalized rectification process.

In Example 77, the calibration process of Example 76 may optionally comprise determining the composite intrinsic parameter matrix based on respective intrinsic parameter matrices for one or more cameras in the heterogeneous camera array that feature the target resolution and the target field of view.

In Example 78, the calibration process of Example 77 may optionally comprise determining the composite intrinsic parameter matrix by averaging respective intrinsic parameter matrices for two or more cameras in the heterogeneous camera array that feature the target resolution and the target field of view.

In Example 79, the calibration process of any of Examples 68 to 78 may optionally comprise determining a composite orientation of the heterogeneous camera array and determining the composite rotation matrix for the heterogeneous camera array based on the composite orientation of the heterogeneous camera array.

In Example 80, the calibration process of Example 79 may optionally comprise determining respective optical center positions for each of the plurality of cameras in the heterogeneous camera array and determining the composite orientation of the heterogeneous camera array based on the optical center positions.

In Example 81, the heterogeneous camera array of Example 80 may optionally comprise a linear camera array.

In Example 82, the calibration process of Example 81 may optionally comprise fitting a line to the optical center positions for each of the plurality of cameras in the heterogeneous camera array and determining the composite orientation of the heterogeneous camera array based on the line.

In Example 83, the heterogeneous camera array of Example 80 may optionally comprise a two-dimensional (2D) camera array.

In Example 84, the calibration process of Example 83 may optionally comprise fitting a set of lines to the optical center positions for each of the plurality of cameras in the heterogeneous camera array and determining the composite orientation of the heterogeneous camera array based on the set of lines.

Example 85 is a system, comprising an image processing apparatus according to any of Examples 65 to 84, a display, a radio frequency (RF) transceiver, and one or more RF antennas.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   logic, at least a portion of which is in hardware, the logic to:
   identify respective rotation matrices for each of a plurality of cameras in a heterogeneous camera array and a composite rotation matrix for the heterogeneous camera array;
   receive a captured image array generated by the heterogeneous camera array;
   select a rectification process for application to the captured image array;
   identify a set of rectification maps for the selected rectification process, the set of rectification maps generated based on the respective rotation matrices for the plurality of cameras in the heterogeneous camera array and on the composite rotation matrix for the heterogeneous camera array; and
   apply the identified set of rectification maps to the captured image array to obtain a rectified image array.

2. The apparatus of claim 1, the logic to generate the identified set of rectification maps in response to the selection of the rectification process.

3. The apparatus of claim 1, the logic to perform a calibration process, the calibration process to comprise determining the respective rotation matrices for each of the plurality of cameras in the heterogeneous camera array, the composite rotation matrix for the heterogeneous camera array, and respective intrinsic parameter matrices for each of the plurality of cameras in the heterogeneous camera array.

4. The apparatus of claim 3, the selected rectification process comprising a native rectification process according to which resolutions and fields-of-view for images in the rectified image array match resolutions and fields-of-view for corresponding images in the captured image array.

5. The apparatus of claim 4, the set of rectification maps generated based on the respective rotation matrices and intrinsic parameter matrices for the plurality of cameras in the heterogeneous camera array and on the composite rotation matrix for the heterogeneous camera array.

6. The apparatus of claim 3, the selected rectification process comprising a normalized rectification process according to which images in the rectified image array comprise a uniform resolution and a uniform field-of-view.

7. The apparatus of claim 6, the set of rectification maps generated based on the respective rotation matrices and intrinsic parameter matrices for the plurality of cameras in the heterogeneous camera array, on the composite rotation matrix for the heterogeneous camera array, and on a composite intrinsic parameter matrix.

8. The apparatus of claim 7, the calibration process comprising determining the composite intrinsic parameter matrix based on respective intrinsic parameter matrices for one or more cameras in the heterogeneous camera array that feature a target resolution and a target field of view for the normalized rectification process.

9. The apparatus of claim 1, comprising:
   a display;
   a radio frequency (RF) transceiver; and
   one or more RF antennas.

10. At least one non-transitory computer-readable storage medium comprising a set of instructions that, in response to being executed on a computing device, cause the computing device to:
identify respective rotation matrices for each of a plurality of cameras in a heterogeneous camera array and a composite rotation matrix for the heterogeneous camera array;
receive a captured image array generated by the heterogeneous camera array;
select a rectification process for application to the captured image array;
identify a set of rectification maps for the selected rectification process, the set of rectification maps generated based on the respective rotation matrices for the plurality of cameras in the heterogeneous camera array and on the composite rotation matrix for the heterogeneous camera array; and
apply the identified set of rectification maps to the captured image array to obtain a rectified image array.

11. The at least one non-transitory computer-readable storage medium of claim 10, comprising instructions that, in response to being executed on the computing device, cause the computing device to generate the identified set of rectification maps in response to the selection of the rectification process.

12. The at least one non-transitory computer-readable storage medium of claim 10, comprising instructions that, in response to being executed on the computing device, cause the computing device to perform a calibration process, the calibration process to comprise determining the respective rotation matrices for each of the plurality of cameras in the heterogeneous camera array, the composite rotation matrix for the heterogeneous camera array, and respective intrinsic parameter matrices for each of the plurality of cameras in the heterogeneous camera array.

13. The at least one non-transitory computer-readable storage medium of claim 12, the selected rectification process comprising a native rectification process according to which resolutions and fields-of-view for images in the rectified image array match resolutions and fields-of-view for corresponding images in the captured image array.

14. The at least one non-transitory computer-readable storage medium of claim 13, the set of rectification maps generated based on the respective rotation matrices and intrinsic parameter matrices for the plurality of cameras in the heterogeneous camera array and on the composite rotation matrix for the heterogeneous camera array.

15. The at least one non-transitory computer-readable storage medium of claim 12, the selected rectification process comprising a normalized rectification process according to which images in the rectified image array comprise a uniform resolution and a uniform field-of-view.

16. The at least one non-transitory computer-readable storage medium of claim 15, the set of rectification maps generated based on the respective rotation matrices and intrinsic parameter matrices for the plurality of cameras in the heterogeneous camera array, on the composite rotation matrix for the heterogeneous camera array, and on a composite intrinsic parameter matrix.

17. The at least one non-transitory computer-readable storage medium of claim 16, the calibration process comprising determining the composite intrinsic parameter matrix based on respective intrinsic parameter matrices for one or more cameras in the heterogeneous camera array that feature a target resolution and a target field of view for the normalized rectification process.

18. A method, comprising:
identifying respective rotation matrices for each of a plurality of cameras in a heterogeneous camera array and a composite rotation matrix for the heterogeneous camera array;
receiving a captured image array generated by the heterogeneous camera array;
selecting, by a processor circuit, a rectification process for application to the captured image array;
identifying a set of rectification maps for the selected rectification process, the set of rectification maps generated based on the respective rotation matrices for the plurality of cameras in the heterogeneous camera array and on the composite rotation matrix for the heterogeneous camera array; and
applying the identified set of rectification maps to the captured image array to obtain a rectified image array.

19. The method of claim 18, comprising generating the identified set of rectification maps in response to the selection of the rectification process.

20. The method of claim 18, comprising performing a calibration process, the calibration process to comprise determining the respective rotation matrices for each of the plurality of cameras in the heterogeneous camera array, the composite rotation matrix for the heterogeneous camera array, and respective intrinsic parameter matrices for each of the plurality of cameras in the heterogeneous camera array.

21. The method of claim 20, the selected rectification process comprising a native rectification process according to which resolutions and fields-of-view for images in the rectified image array match resolutions and fields-of-view for corresponding images in the captured image array.

22. The method of claim 21, the set of rectification maps generated based on the respective rotation matrices and intrinsic parameter matrices for the plurality of cameras in the heterogeneous camera array and on the composite rotation matrix for the heterogeneous camera array.

23. The method of claim 20, the selected rectification process comprising a normalized rectification process according to which images in the rectified image array comprise a uniform resolution and a uniform field-of-view.

24. The method of claim 23, the set of rectification maps generated based on the respective rotation matrices and intrinsic parameter matrices for the plurality of cameras in the heterogeneous camera array, on the composite rotation matrix for the heterogeneous camera array, and on a composite intrinsic parameter matrix.

25. The method of claim 24, the calibration process comprising determining the composite intrinsic parameter matrix based on respective intrinsic parameter matrices for one or more cameras in the heterogeneous camera array that feature a target resolution and a target field of view for the normalized rectification process.

* * * * *